US012669017B2

(12) United States Patent
     Knickrehm

(10) Patent No.: US 12,669,017 B2
(45) Date of Patent: Jun. 30, 2026

(54) CLIMB ASSIST VELOCITY CONTROL

(71) Applicant: Safeworks, LLC, Tukwila, WA (US)

(72) Inventor: Morgan Knickrehm, Kalispell, MT (US)

(73) Assignee: Safeworks, LLC, Tukwila, WA (US)

( * ) Notice: Subject to any disclaimer, the term of this patent is extended or adjusted under 35 U.S.C. 154(b) by 0 days.

(21) Appl. No.: 16/037,858

(22) Filed: Jul. 17, 2018

(65) Prior Publication Data

US 2019/0017325 A1 Jan. 17, 2019

Related U.S. Application Data

(60) Provisional application No. 62/533,605, filed on Jul. 17, 2017.

(51) Int. Cl.
    *E06C 7/12* (2006.01)
    *A62B 1/08* (2006.01)
    (Continued)

(52) U.S. Cl.
    CPC .................. *E06C 7/12* (2013.01); *A62B 1/08* (2013.01); *A62B 35/005* (2013.01); *A63B 29/00* (2013.01);
    (Continued)

(58) Field of Classification Search
    CPC ... E06C 7/12; E06C 7/186; A62B 1/08; A62B 35/005; A62B 1/10; A63B 29/00;
    (Continued)

(56) References Cited

U.S. PATENT DOCUMENTS 684,562 A 10/1901 Wilhelm
4,458,781 A 7/1984 Ellis et al.
(Continued)

FOREIGN PATENT DOCUMENTS

CN 2193173 Y 3/1995
CN 101978129 A 2/2011
(Continued)

OTHER PUBLICATIONS

International Patent Application No. PCT/US2018/042515; Int'l Search Report and the Written Opinion; dated Nov. 2, 2018; 11 pages.
(Continued)

*Primary Examiner* — Colleen M Chavchavadze
(74) *Attorney, Agent, or Firm* — Foley & Lardner LLP

(57) ABSTRACT

A climb assist system dynamically adjusts a rate and a level of load assist that the system provides to a climber during traverse of a structure. The system includes a load sensor system configured to detect the state of the climber, such as the load applied by the climber to an assist rope, to provide an upward support force on the climber to compensate the climber's weight. Additionally, the system includes a sender configured to transmit data to a receiver of the system. The system includes a controller configured to interpret the received data and thereafter provide control through a controlled motor and drive system to provide load assist to the climber. A safety function of the system is configured to receive data indicative of a rate of descent of the climber, and slow or stop the descent if one or more conditions are met.

20 Claims, 12 Drawing Sheets

(51) Int. Cl.

| | |
|---|---|
| *A62B 35/00* | (2006.01) |
| *A63B 29/00* | (2006.01) |
| *E06C 7/18* | (2006.01) |
| *G01L 1/04* | (2006.01) |
| *G01L 1/12* | (2006.01) |
| *G01L 5/00* | (2006.01) |
| *G05D 15/01* | (2006.01) |
| *H02P 6/08* | (2016.01) |
| *F03D 80/50* | (2016.01) |

(52) U.S. Cl.
CPC ............... *E06C 7/186* (2013.01); *G01L 1/04* (2013.01); *G01L 1/122* (2013.01); *G01L 5/0028* (2013.01); *G05D 15/01* (2013.01); *H02P 6/085* (2013.01); *F03D 80/50* (2016.05); *F05B 2240/912* (2013.01); *H02P 6/08* (2013.01)

(58) Field of Classification Search
CPC ......... G01L 1/04; G01L 1/122; G01L 5/0028; G05D 15/01; H02P 6/085; H02P 6/08; F03D 80/50; F05B 2240/912
See application file for complete search history.

(56) References Cited

U.S. PATENT DOCUMENTS

| | | | |
|---|---|---|---|
| 4,904,916 | A | 2/1990 | Gisske et al. |
| 4,979,588 | A | 12/1990 | Pike et al. |
| 4,997,064 | A | 3/1991 | Motte et al. |
| 5,390,104 | A | 2/1995 | Fulton |
| 5,671,824 | A | 9/1997 | Keegan et al. |
| 5,845,739 | A | 12/1998 | Ohtsuki |
| 5,927,440 | A | 7/1999 | Freeman |
| 6,161,639 | A | 12/2000 | Jones |
| 6,330,931 | B1 | 12/2001 | Baillargeon et al. |
| 6,390,952 | B1 | 5/2002 | Wilson |
| 6,854,562 | B2 * | 2/2005 | Kwak ...................... B66C 23/18 182/8 |
| 7,198,134 | B2 | 4/2007 | LeMieux |
| 7,404,360 | B2 | 7/2008 | Cylvick |
| 7,798,288 | B2 * | 9/2010 | Blasek ...................... E06C 7/18 182/42 |
| 8,141,681 | B2 * | 3/2012 | Brickell ................... A62B 1/10 182/37 |
| 8,596,416 | B2 * | 12/2013 | Crew ....................... E06C 7/12 182/103 |
| 9,784,034 | B2 * | 10/2017 | Short ...................... E06C 7/186 |
| 2004/0020719 | A1 | 2/2004 | Kwak |
| 2004/0045768 | A1 | 3/2004 | Puszkiewicz et al. |
| 2004/0262078 | A1 | 12/2004 | Bailey |
| 2005/0098383 | A1 | 5/2005 | Halevy |

| | | | |
|---|---|---|---|
| 2006/0032704 | A1 | 2/2006 | Chandra |
| 2007/0004567 | A1 | 1/2007 | Shetty et al. |
| 2007/0039778 | A1 * | 2/2007 | Ashmus ................... A62B 1/08 182/73 |
| 2007/0056801 | A1 | 3/2007 | Iversen |
| 2007/0107984 | A1 * | 5/2007 | Bissett ..................... A62B 1/20 182/3 |
| 2007/0158137 | A1 * | 7/2007 | Petersen ................ E06C 7/186 182/8 |
| 2008/0185221 | A1 | 8/2008 | Postma |
| 2009/0173573 | A1 | 7/2009 | Teichert |
| 2009/0211846 | A1 | 8/2009 | Taylor |
| 2009/0249712 | A1 | 10/2009 | Brickell et al. |
| 2009/0288913 | A1 | 11/2009 | Nielsen |
| 2010/0130108 | A1 | 5/2010 | Mann |
| 2010/0163339 | A1 | 7/2010 | Han |
| 2010/0219016 | A1 | 9/2010 | Meillet |
| 2010/0231402 | A1 | 9/2010 | Flynt et al. |
| 2012/0175186 | A1 | 7/2012 | Brickell et al. |
| 2013/0153334 | A1 * | 6/2013 | Crew ...................... E06C 7/186 182/19 |
| 2013/0180802 | A1 * | 7/2013 | Cohen ..................... E06C 7/186 182/129 |
| 2014/0060970 | A1 * | 3/2014 | Zwirn ....................... E06C 7/16 182/42 |
| 2015/0368972 | A1 * | 12/2015 | Patron .................... E06C 7/186 182/8 |
| 2018/0107169 | A1 * | 4/2018 | Hu ..................... A62B 35/0093 |
| 2019/0169934 | A1 * | 6/2019 | Adams .................. A62B 35/04 |

FOREIGN PATENT DOCUMENTS

| | | |
|---|---|---|
| CN | 102015031 A | 4/2011 |
| CN | 103203094 A | 7/2013 |
| CN | 203742429 U | 7/2014 |
| DE | 20216895 U1 | 1/2003 |
| EP | 1277495 A1 | 1/2003 |
| EP | 2268363 A1 | 1/2011 |
| FR | 2440906 A1 | 6/1980 |
| GB | 2470370 A | 11/2010 |
| KR | 2015-0045324 A | 4/2015 |
| WO | WO 2009/126541 A1 | 10/1990 |
| WO | WO 2005/088063 A1 | 9/2005 |
| WO | WO 2006/111737 A1 | 10/2006 |

OTHER PUBLICATIONS

European Patent Application No. 18834971.6; Extended Search Report; dated Mar. 4, 2021; 7 pages.
International Patent Application No. PCT/US2018/042515; Int'l Preliminary Report on Patentability; dated Jan. 30, 2020; 8 pages.
http://www.adhocelectronics.com/EnOcean; "Self-Powered Wireless Control"; Ad Hoc Electronics; © 2016; accessed Sep. 18, 2018; 1 page.

* cited by examiner

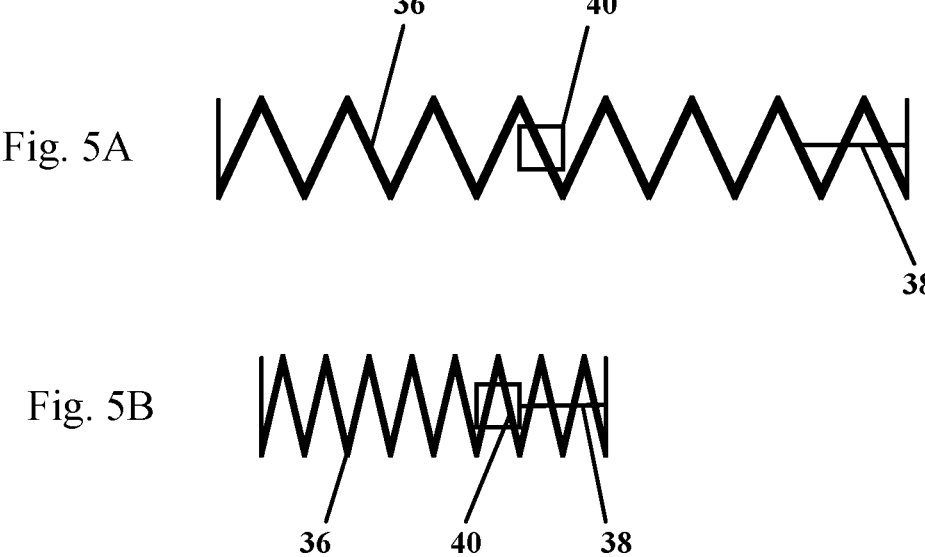
Fig. 5A
Fig. 5B
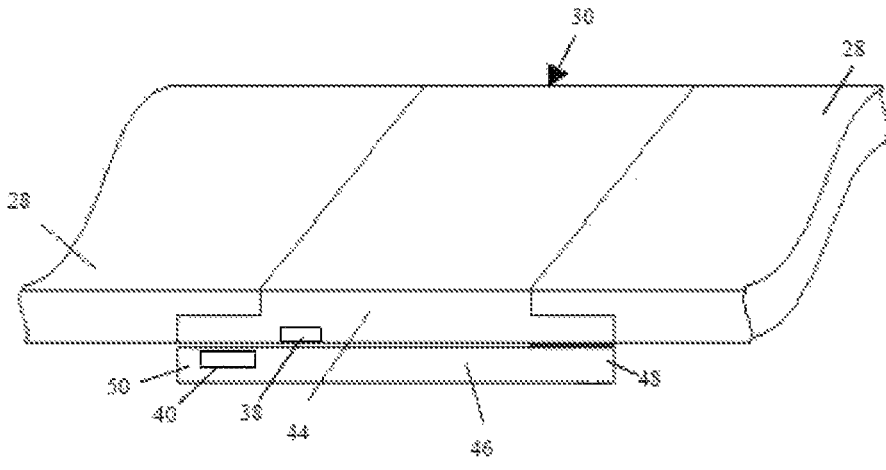
Fig. 6

CLIMB ASSIST VELOCITY CONTROL

CROSS-REFERENCE

This application claims benefit under 35 U.S.C. § 119(e) of Provisional U.S. patent application No. 62/533,605, filed Jul. 17, 2017, the contents of which are incorporated herein by reference in their entirety.

TECHNICAL FIELD

This invention relates in general to a means of providing support for a portion of a person's weight during ascent and descent of a structure.

BACKGROUND

Renewable energies such as solar energy are becoming an increasingly significant technology. Renewable energy manifests in many different forms, one of which is wind energy that can be captured by wind turbines. Wind turbines have many parts that move and require routine maintenance. To perform this maintenance, technicians must typically ascend a tower of the wind turbine and perform inspections and maintenance tasks at various points along the tower including the top of the tower.

SUMMARY

Embodiments of the present disclosure can be used for assisting a climber when climbing a structure such as a ladder. The embodiments may provide assistance that reduce fatigue and enhance the safety of the climber by transporting the climber and the climber's tools and materials to various levels and up to the summit of such extensive climbs, while providing a safety function in the event of a sudden downward movement during the climb or descent.

The methods and systems disclosed herein may also be applied to many other fields of use including rock climbing, building escape or rescue methods, or any other application requiring vertical or near vertical transport of materials and tools.

An aspect of the disclosure is to provide dynamic adjustment of the rate and level of assist to the climber over the period of traverse of the ladder. Such a system allows implementation of differing control strategies ranging from constant speed to constant load or a hybrid of both strategies. In one aspect, a sensor is attached to the person to provide direct load sensing. In another aspect, the degree of assist may be prescribed, and be selectively dependent on attributes of the climber, namely level of fitness and the need for rest, body weight which could be low or high represented by a reasonable range such as 100 lbs to 300 lbs, ability to climb fast or slowly, and how a climber may tire over a long climb with the resulting preferred change in the degree of climb assist. The disclosed embodiments provide the ability to select the degree of assist at any point in the climb. Moreover, the climber can communicate with the controller from anywhere during the climb.

Additionally, a safety function may be provided that automatically determines when a climber's behavior is not safe and is configured to stop the climber or provide corrective feedback to the climber. In various embodiments, safe behavior may be defined as climbing at a steady rate while maintaining control during the climb.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the present disclosure is not limited to the specific methods and instrumentalities disclosed. In the drawings:

FIG. 5A is a side elevation view of a load sensor system according to one aspect of the disclosure, the load sensor system in a first position;

FIG. 5B is a side elevation view of the load sensor system illustrated in FIG. 5A, the load sensor system in a second position;

FIG. 6 is a side elevation view of a sensor system according to one aspect of the disclosure;

DETAILED DESCRIPTION OF ILLUSTRATIVE EMBODIMENTS

Persons working on tall structures such as wind turbines should be provided tools to assist the ascending and descending of long climbs up and down the tall structure. The task of carrying a plurality of tools and materials can tax the strength of the climber, thereby exposing the climber to an increased chance of injury. In addition, the number of tools and materials might be more than one climber can carry on their person at one time, thus requiring the climber to make multiple trips ascending and descending the tall structure to retrieve the necessary tools and materials to complete a job. For example, ladders inside of wind turbines may have heights of 50 feet to 350 feet or higher. Consequently, a climber may experience fatigue when climbing such a ladder, at times while carrying tools and other materials.

Embodiments of the systems described herein may provide assistance that reduce fatigue and enhance the safety of the climber by transporting the climber and the climber's tools and materials to various levels and up to the summit of such extensive climbs, while providing a safety function in the event of a sudden downward movement during the climb or descent.

In various embodiments described herein, a system or device is disclosed that may implement a climb assist control system including a safety function. Examples of the climb assist control system are further described below. The safety function may be implemented as software or firmware. The software or firmware may be provided at the remote control, sender, receiver, and/or motor controller of the safety function.

In one embodiment, the safety function may be configured to operate in the down direction during the normal operation of the climb assist control system. The safety function may be configured to apply a braking force when the system detects an unsafe climb. The braking force may be applied at the cable or rope, at the motor, or at other points in the climb assist control system to slow or stop the descent of the climber.

Figure 1:
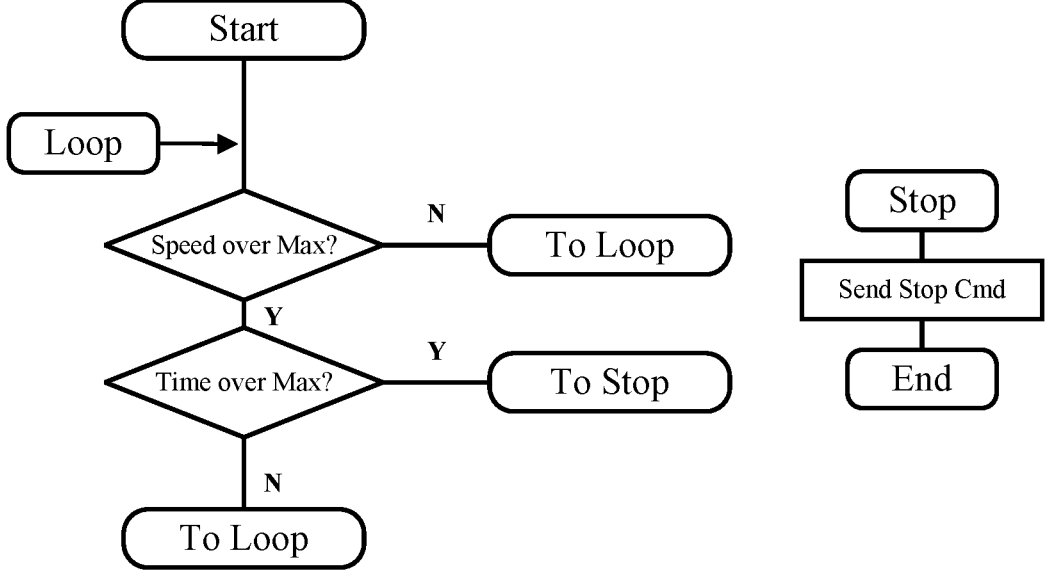
FIG. 1 is a flow chart of a safety function for a climb assist system according to one aspect of the disclosure.

In an embodiment, the safety function may be configured to detect excess speed, at any point during use by the climber, over a period of time, or a predetermined number of counts. For example, if the detected speed of the climber is 0.75 m/s for 1.5 seconds, or 0.75 m/s for 3 cycles or periods, then the safety function may be configured to apply a braking force. Referring to FIG. 1, in an embodiment the safety function may be configured to determine if the detected speed is greater than a predetermined limit. If the detected speed is less than the limit, then the safety function can continue monitoring for overspeed. If the detected speed is greater than or equal to the limit, then the safety function can be configured to immediately send a command to stop or slow the descent of the climber. Alternatively, if the detected speed is greater than or equal to the limit, then the safety function can then determine if the climber remains at or above the limit for a specified period of time. If the climber does not remain at or above the limit for the specified period of time, then the safety function can continue monitoring for overspeed. If the climber remains at or above the limit for the specified period of time, then the safety function can send a command to stop or slow the descent of the climber.

In an embodiment, the safety function may be configured to detect excess acceleration. If the detected acceleration is greater than or equal to a predetermined limit, then the safety function can configured to immediately send a command to stop or slow the descent of the climber. Alternatively, the safety function may be configured to detect excess acceleration over a period of time or counts. For example, if the detected acceleration of the climber is greater than 0.75 g for 1 or more seconds, or if the detected speed of the climber is greater than 0.75 m/s for 3 cycles or periods, then the safety function may be configured to send a command to stop or slow the descent of the climber.

In an embodiment, the safety function may be configured to detect excess load. If the detected load is greater than or equal to a predetermined limit, then the safety function can configured to immediately send a command to stop or slow the descent of the climber. Alternatively, the safety function may be configured to detect excess load over a period of time or counts. For example, if the detected load is greater than 135% of the desired load for 2 seconds or greater than 200 lbs for 2 seconds, then the safety function may be configured to stop or slow the descent of the climber.

In an embodiment, the safety function may be configured to detect speed greater than a predetermined threshold for any period of time. For example, if the detected speed is greater than 1.5 m/s for any detectable period of time, then the safety function may be configured to apply a braking force.

In an embodiment, the safety function may be configured to detect excess jerk. The safety function can be configured such that if the detected jerk is greater than or equal to a predetermined limit, the safety function immediately sends a command to stop or slow the descent of the climber. Alternatively, the safety function may be configured to detect excess jerk over a period of time or counts. For example, if the detected jerk is greater than 12 m/s/s for 0.2 seconds, then the safety function may be configured to apply a braking force.

Figure 2:
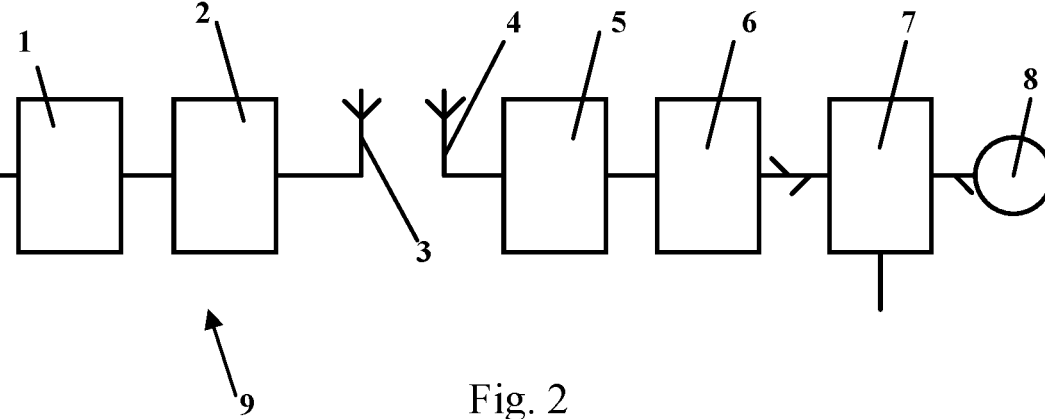
FIG. 2 is a flow chart of a safety function for a climb assist system according to one aspect of the disclosure.

Referring to FIG. 2, the functionality of the safety function may be implemented in a microprocessor 1 of a remote control device 9. The microprocessor 1 may have access to data indicative of the climber's state. The decision to brake can be sent from the microprocessor 1 to transmitter 2. The transmitter 2 may modulate and transmit a signal data that indicates that the brake should be applied. The transmitter 2 may send the signal data via an antenna 3 to a receiver antenna 4. The received signal data may be converted to demodulated data at a receiver 5 and provided to a microprocessor 6. The microprocessor 6 may cause the brake command to be transmitted to a motor controller 7, which can be configured to take action to stop the descent of the climber, such as stopping the motor 8.

In an embodiment, firmware that implements the safety function may be installed at the microprocessor 6 if a remote control device is either not implemented, or for other reasons such as efficient processing and data availability.

Embodiments of the disclosure may be implemented in a context of various climb assist systems. In one embodiment, a sensor configured to detect a load that a climber exerts on an assist rope is incorporated into the climb assist system. The sensor data may be used in part to control the amount of power needed to assist the climber. Additionally, the climb assist system may also include a sender to transmit the load data to a receiver, a transmission path, and a receiver to receive the data from the sender, a supervisory controller to interpret the received data and a controlled motor and drive to provide energy to the assist rope. A one way wireless or open loop communication for system control may be implemented, or full duplex communication may also be implemented, where the receiver also transmits data to the sender to provide an annunciation to the climber, bidirectional verification of integrity of the wireless link, message error correction, and the like.

Sensors configured to detect a change in a load of a person is one example of determining the state of the climber. Alternatively, or in addition to the sensor configured to detect a change in load, sensors configured to detect any other change in the state of a climber may be employed. For example, changes in eye movement, body temperature, heart rate, or other physical data are also possible indicators of a climber's state and physical attributes.

Figure 3:
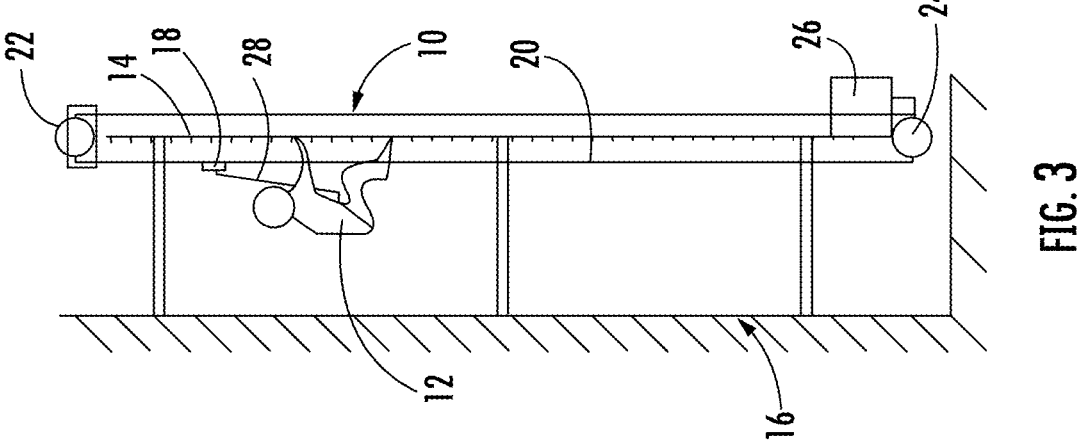
FIG. 3 is a side elevation view of a ladder climb assist system according to one aspect of the disclosure.

Referring to FIG. 3 a climb assist system 10 can be used by a climber 12 on a ladder 14, for example during ascent or descent of a structure 16, such as a tower. For example, the climber 12 can be a member of service personnel climbing a ladder during a maintenance routine of a wind turbine. An applied load, including the climber 12, tools, materials, or any combination thereof, may be attached by a rope grab 18 to an assist rope 20 which may be in the form of a continuous loop of material such as flexible wire or natural or synthetic rope with appropriate modifications or coatings to ensure efficacy in the application, extending between a first sheave 22 at an upper level of the tower and a second sheave 24 at a lower level of the tower. The climb assist system 10 can be configured to provide assisted ascent, descent, or both over various distances and with various amounts of force. The climb assist system 10 may be configured to assist the climber 12 in ascending and descending other structures such as signal tower, bridges, dams, and skyscrapers.

According to one aspect of the disclosure, the climb assist system 10 can include a drive system 26 configured to supply a force to the climber 12, for example via one or both of the first sheave 22 and the second sheave 24. As shown in the illustrated embodiment, the drive system 26 can be located at or near the lower level such that the drive system 26 provides a force, for example a torque to the first sheave 22. Alternative locations of the drive system 26 may also be used.

According to one aspect of the disclosure, the climb assist system 10 can include a lanyard 28 configured to connect the climber 12 to the climb assist system 10. As shown in the illustrated embodiment, the lanyard 28 can be configured to connect the climber 12, for example via a commercially available body harness worn by the climber 12, and the rope grab 18. In addition and as required by Occupational Safety and Health Administration (OSHA) regulations, the climber 12 should be connected to an appropriate fall arrest device which is not further discussed in this disclosure.

Aspects of this disclosure relate to dynamic adjustment of a rate of assist, a level of assist, or both. According to one aspect of the disclosure, the rate of assist includes speed of the assist rope 20. According to one aspect of the disclosure, the level of assist includes how much force is applied to the climber 12, load, or both. The climber's 12 needs may change over the period of traverse of the ladder 14. For example, the climber 12 may need to climb slower or faster than a current speed of the assist rope 20 speed, additionally the weight of the climber 12 may change during the climb (as equipment or materials are dropped off along the way). Thus, the disclosed climb assist system 10 may be configured to adjust the rate of assist, level of assist, or both in view of, for example, the climber's 12 fitness, weight, desired climb speed, or any combination thereof.

Figures 7A, 7B, 8:
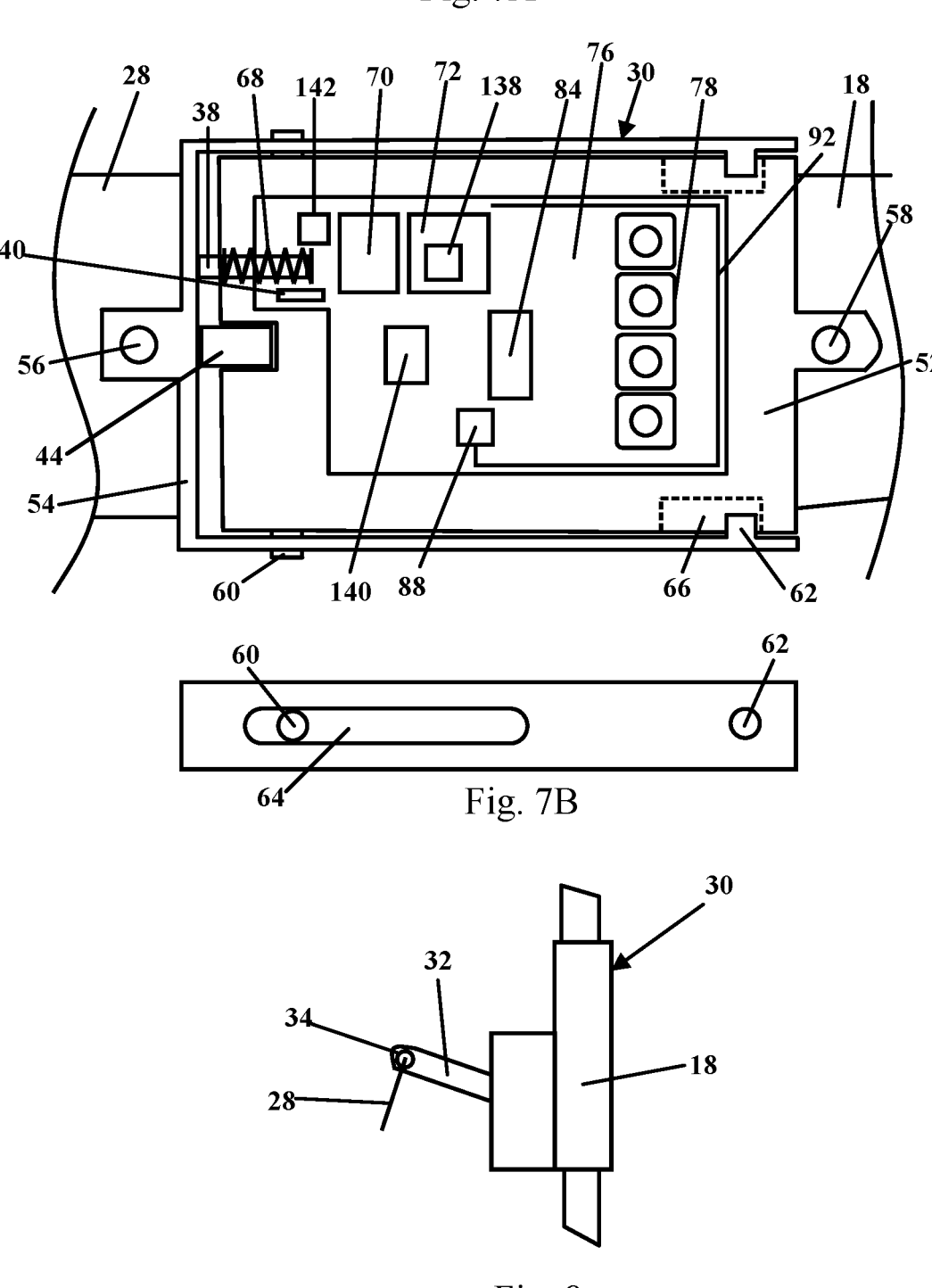
FIG. 7A is a top plan view of a sensor system according to one aspect of the disclosure.
FIG. 7B is a top plan view of a sensor system according to one aspect of the disclosure.
FIG. 8 is a side elevation view of a sensor system according to one aspect of the disclosure.

Referring to FIGS. 3 and 8, the climb assist system 10 can include a load sensor system 30. As shown in the illustrated embodiment, the load sensor system 30 can be configured to be incorporated with the rope grab 18. According to one aspect of the disclosure, the load sensor system 30 can include a lever 32 supported by the rope grab 18 such that the lever 32 is movable relative to the rope grab 18 as load is applied to attachment point 34 by the lanyard 28 attached to the climber 12. The load sensor system 30 can be configured to generate a signal representative of the load and communicate the signal as further detailed below.

Figure 4:
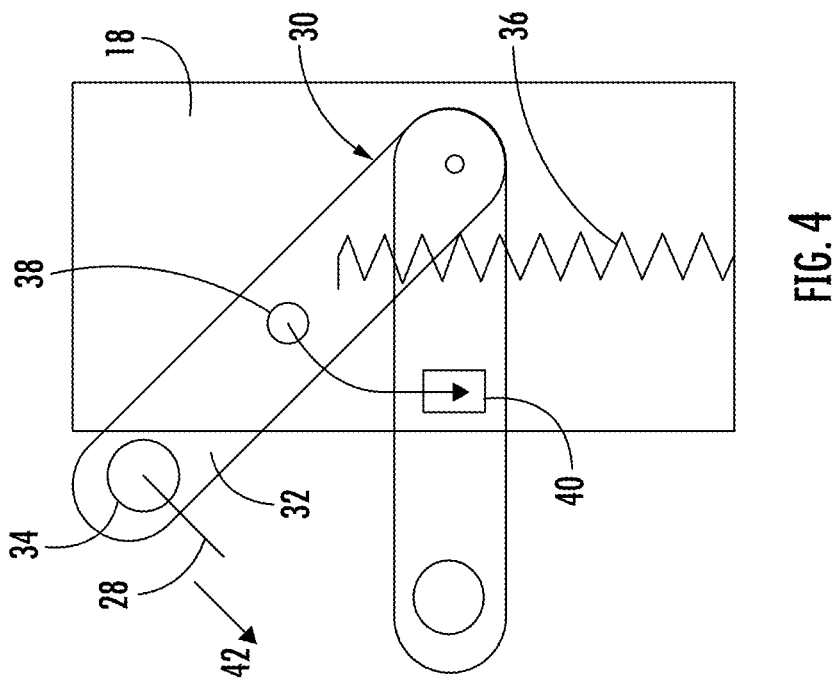
FIG. 4 is a side elevation view of a load sensor system according to one aspect of the disclosure.

Referring to FIG. 4, the load sensor system 30 can be configured to be incorporated into the rope grab 18. As shown the load sensor system 30 can include a biasing member, such as a spring 36. As shown in the illustrated embodiment, the load sensor system 30 can be configured such that when a load is applied to the lever 32, for example, at the attachment point 34, the spring 36 is compressed. The spring 36 may be a wound wire compression spring but other types of spring systems may equally be applied for this purpose, including but not limited to expansion or torsion types of springs made of metal or other compressible materials and systems such as rubber, elastic, hydraulic or pneumatic systems. The load sensor system 30 can include a magnet 38 and a Hall Effect device (HED) 40. As shown in the illustrated embodiment, the magnet 38 can be supported by the lever 32 such that as the spring 36 compresses under increasing load, the magnet 38 moves towards the HED 40 in the direction indicated by the arrow 42. The load sensor system 30 may be configured to measure the changing electrical signal from the HED 40 as a representation of the applied load. Alternatives to the HED 40, such as employing a strain gauge as part of a load cell, may be implemented.

Alternative structures are contemplated to perform the stated functions, including optical, alternative magnetic, strain, or resistive components. The load sensor system 30 may define a neutral or zero external load position. The neutral position may be similar to the position of the magnet 38 relative to the HED 40 shown in the illustrated embodiment. Alternatively, the relative position of the magnet 38 and the HED 40 in the neutral position may be different from the position illustrated in the illustrated embodiment. For example, in the neutral position the magnet 38 may be positioned relative to the HED 40 such that increasing the applied load causes the magnet 38 to move away from HED 40. The relative direction of the electrical signal to movement of the magnet 38 will change accordingly, but remains representative of the applied load.

Referring to FIGS. 5A and 5B, according to one aspect of the disclosure the load sensor system 30 can be configured such that the magnet 38 is supported by, for example disposed within, the spring 36. As shown in the illustrated embodiment, the spring 36 is configured to compress in response to an increase of the applied load, thereby moving the magnet 38 relative to HED 40, for example towards the HED 40 in the direction indicated by the arrow 42. The HED 40 can also be supported by, for example disposed within, the spring 36. As described above the HED 40 can be configured to generate an electrical signal representative of the applied load. Similarly, the alternative sensing methods discussed above also apply to this configuration of sensing.

The load sensor system 30 disclosed in FIGS. 4, 5A, and 5B may be configured for attachment to the rope grab 18, the lanyard 28, or both such that the load sensor system 30 is configured to respond directly to the load imposed between the climber 12 and the assist rope 20.

Referring to FIGS. 3 and 6, the load sensor system 30 can include a load reactive or stretchable material 44. As shown in the illustrated embodiment the stretchable material 44 can be in series with the lanyard 28 connected between the rope grab 18 and the climber 12, such that the load sensor system 30 is directly responsive to the load imposed between climber 12 and the assist rope 20. In one embodiment, the magnet 38 can be embedded in the stretchable material 44. As shown in the illustrated embodiment, the load sensor system 30 can include a substrate 46, the substrate 46 having a first end 48 configured to be fixed relative to the lanyard 28. The substrate 46 can carry the HED 40, for example at or near a second end 50 of the substrate 46. As shown in the illustrated embodiment, the second end of the substrate 46 can be unconstrained relative to the lanyard 28. According to one aspect of the disclosure, the load sensor system 30 can be configured such that as the load is applied at least one of the HED 40 and the magnet 38 move relative to each other thereby generating an electrical signal as described above representative of the load. The positions of the HED 40 and the magnet 38 could be reversed from those in the illustrated embodiment, and additionally the HED 40 and the magnet 38 could both be placed on the stretchable material 44.

To ensure that the electrical signal from the HED 40 is not subject to erroneous interpretations as load changes, guiding systems may be incorporated in the structure 16 to ensure that the relative position of the magnet 38 to the HED 40 is not subject to variation caused by orientation, vibration or other considerations. These are not specifically described as this is considered to be within the design capability of a skilled mechanical systems designer.

Referring to FIGS. 7A and 7B, the load sensor system 30 can include an inner shell 52, an outer shell 54, and the stretchable material 44 attached between the inner shell 52 and the outer shell 54. The inner shell 52 and the outer shell 54 can be constrained to move relative to each other in response to a load being applied to the climb assist system 10. As shown in the illustrated embodiment, the outer shell 54 may be attached to the lanyard 28 at first attachment location 56 and the inner shell 52 may be attached to the rope grab 18 at second attachment location 58. According to one aspect of the disclosure, the attachment described above may be by conventional means such as a carabineer to an eye hook. As the inner shell 52 and the outer shell 54 are displaced relative to each other, the stretchable material 44 provides a restoring force. An alternative arrangement where the stretchable material 44 acts in compression may also be used.

The load sensor system 30 may include one or more pins 60 and 62 and one or more corresponding slots 64 and 66. Constraint of planarity and degree of available displacement between the inner shell 52 and the outer shell 54 may be provided by the pins 60 and 62 moving within the slots 64 and 66, respectively.

According to one embodiment, the magnet 38 can be affixed to the outer shell 54 such that the magnet 38 moves relative to the HED 40, which can be affixed to the inner shell 52, in response to load applied to the climb assist system 10, such that the HED 40 provides a load responsive electrical signal. Additionally, the load sensor system 30 can include a coil 68 positioned such that as the magnet 38 moves relative to the coil 68, which can be affixed to the inner shell 52, thereby generating electrical current by well-known principles of Faraday's Law of Electromagnetic Induction. The electrical current may be applied to a rectifier 70 and a charging system 72 to augment energy storage as disclosed herein.

According to one aspect of the disclosure, the load sensor system 30 can include a switch configured to transmit a stop signal thereby terminating assist provided by the climb assist system 10. According to one embodiment, the load sensor system 30 may be configured such that a distance between the inner shell 52 and the outer shell 54 can be increased to a maximum extent thereby activating the switch. For example, the load sensor system 30 can include a pin configured to be pulled, thus operating the switch and immediately transmitting a stop message.

In configurations of the above-described load sensor system 30, the electronic components further described below may be disposed on a printed circuit board, for example 76. In addition, operable controls 78 may be included to allow direct selection of modes of assist. For example, the operable controls 78 may be press buttons to select from a menu of speeds, load support, time responsiveness or other parameters which may be determined as desirable. Such selections may being communicated to the drive system 26 to provide a selected level of assist.

Figure 10:
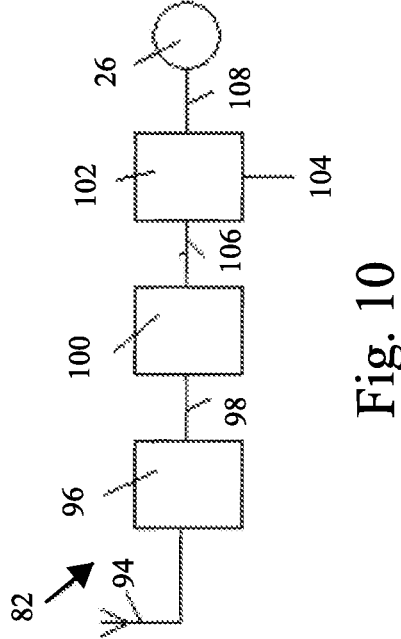
FIG. 10 is a diagram of a receiver of a climb assist system according to one embodiment.
Figure 9:
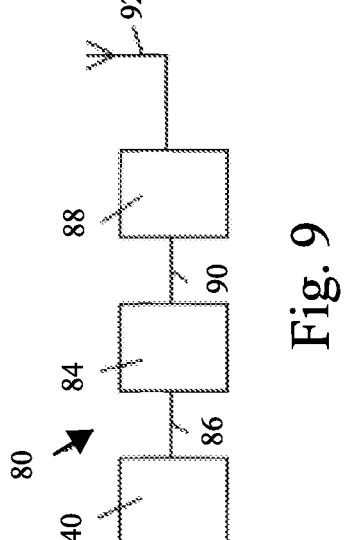
FIG. 9 is a diagram of a sender of a climb assist system according to one embodiment.
Figure 11:
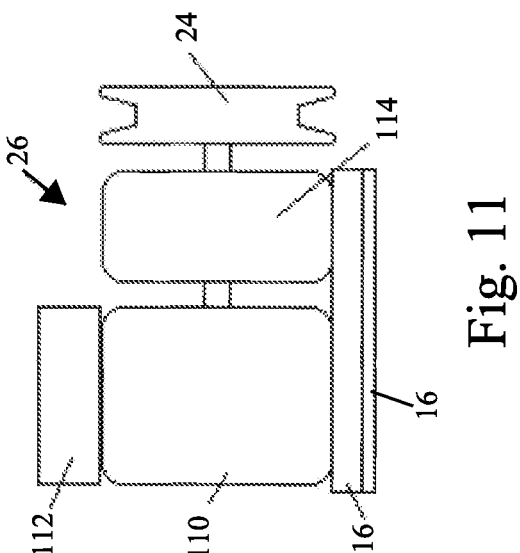
FIG. 11 is a side elevation view of a motorized drive system according to one aspect of the disclosure.

Referring to FIGS. 9, 10, and 11, the climb assist system 10 can include a sender 80 and a receiver 82. According to one aspect of the disclosure, the sender 80 can include the HED 40, a sender microprocessor 84, and a line 86 connecting the HED 40 to the sender microprocessor 84. According to one aspect of the disclosure, the HED 40 generates an electrical signal representative of the applied load, and the line 86 carries signal to the sender microprocessor 84. The sender 80 can further include a transmitter 88 and a line 90 configured to send the signal from the sender microprocessor 84 to the transmitter 88. The sender 80 can further include a sender antenna 92 configured to transmit the signal to the receiver 82.

The receiver 82 can include a receiver antenna 94 configured to receive the signal from the sender antenna 92. The receiver 82 can further include a signal converter 96 configured to convert the signal and pass the converted signal along a line 98 to a receiver microprocessor 100. The receiver microprocessor 100 can be configured to convert the converted signal into control actions. The receiver 82 can further include a drive control 102 configured to receive power, for example from a main power supply line 104, and convert the received power and received control actions, from the receiver microprocessor 100 along a line 106, to instructions that determine activity of the drive system 26. The drive control 102 can be connected to the drive system 26 by a line 108.

Referring to FIG. 11, the drive system 26 can include a motor 110, a supervisory system 112, a gearbox 114, or any combination thereof. The supervisory system 112 can include or can be connected to one or more components of the receiver 82 (shown in FIG. 10). As shown in the illustrated embodiment, the motor 110, the gearbox 114, or both can be mounted on a base 116. The motor 110 type may be selected from ac or dc, synchronous, non-synchronous, synchronous, permanent magnet, brush or brushless, stepping and wound rotor and or stator types, as are well known. According to one aspect of the disclosure, the motor 110 can be a synchronous ac type, however other types of motors will fulfill the requirements of the drive system 26 as described herein, including single and multi-phase.

Power delivered to the motor 110 can be from the drive control 102, which may be selected from commercially available types including variable frequency (VF), pulse width modulated (PWM), phase controlled, voltage controlled or current limited types. The gearbox 114 may be positioned and configured to transfer the rotational speed of the motor 110 to at least one of the first sheave 22 and the second sheave 24. As shown in the illustrated embodiment, the gearbox 114 can be positioned between the motor 110 and the second sheave 24. The gearbox 114 can be selected from worm drive, planetary, harmonic, or other well-known types. These gearbox types each confer different attributes, and depending on the drive system 26 selected for use in the climb assist system 10, may be omitted, for example if the selected motor type is able to deliver the required torque without a gearbox and also provide for safe operation of the system under fault and emergency conditions. For convenience of description the motor 110, the gearbox 114 and the second sheave 24 are depicted as an in-line arrangement in the illustrated embodiment. However they may be positioned alternatively, based on other factors such as mechanical convenience determined by the respective structure 16.

In one embodiment the drive system 26 can include the motor 110 in the form of an induction motor, and further include the gearbox 114 configured to reduce speed output from the motor to the second sheave 24. The drive system 26 can include a brake configured to positively lock the drive system 26 when power supply to the motor 110 is terminated. In one embodiment, for example where a worm drive is implemented, the drive system 26 may be devoid of a brake because of the high friction of reverse drive in a worm drive. The drive system 26 can include components configured to detect and display motor speed, direction of rotation of the motor 110, or both.

Referring to FIGS. 10 and 11, the drive control 102 can be configured to transform power received from the power supply line 104 to a power characteristic used by the motor 110 to drive the second sheave 24. According to one embodiment, the power supply is 230 Vac and the power used by the motor 110 is of variable frequency from zero to 120 Hz and voltage variable between zero and 230 Vac. Other external power supply values may be provided and other specified limits may additionally be imposed for motor control including current limit, overload sensing and overspeed sensing. This allows control of both motor speed and torque to provide the assist characteristics required.

The supervisory system 112 can include the receiver antenna 94, or a similar component configured to receive signals from the load sensor system 30. According to one aspect of the disclosure, the transmission method for the signal is wireless and is unidirectional from the load sensor system 30 to the drive control 102. Of course, other implementations for transmission of the signal may be used such as wired, sound (ultrasonic), light (UV, visible or IR), induction (coupled via the assist rope if metallic), or other available methods. The nature of transmission of the signal will not be further considered in this invention and is considered well known to those skilled in the art. Also unidirectional transmission is specified for simplicity, but bidirectional including duplex transmission is also feasible and may offer the capability of communicating information from other sources, for example but not limited to, motor or drive conditions, communication link integrity and other advisory information.

Figure 12:
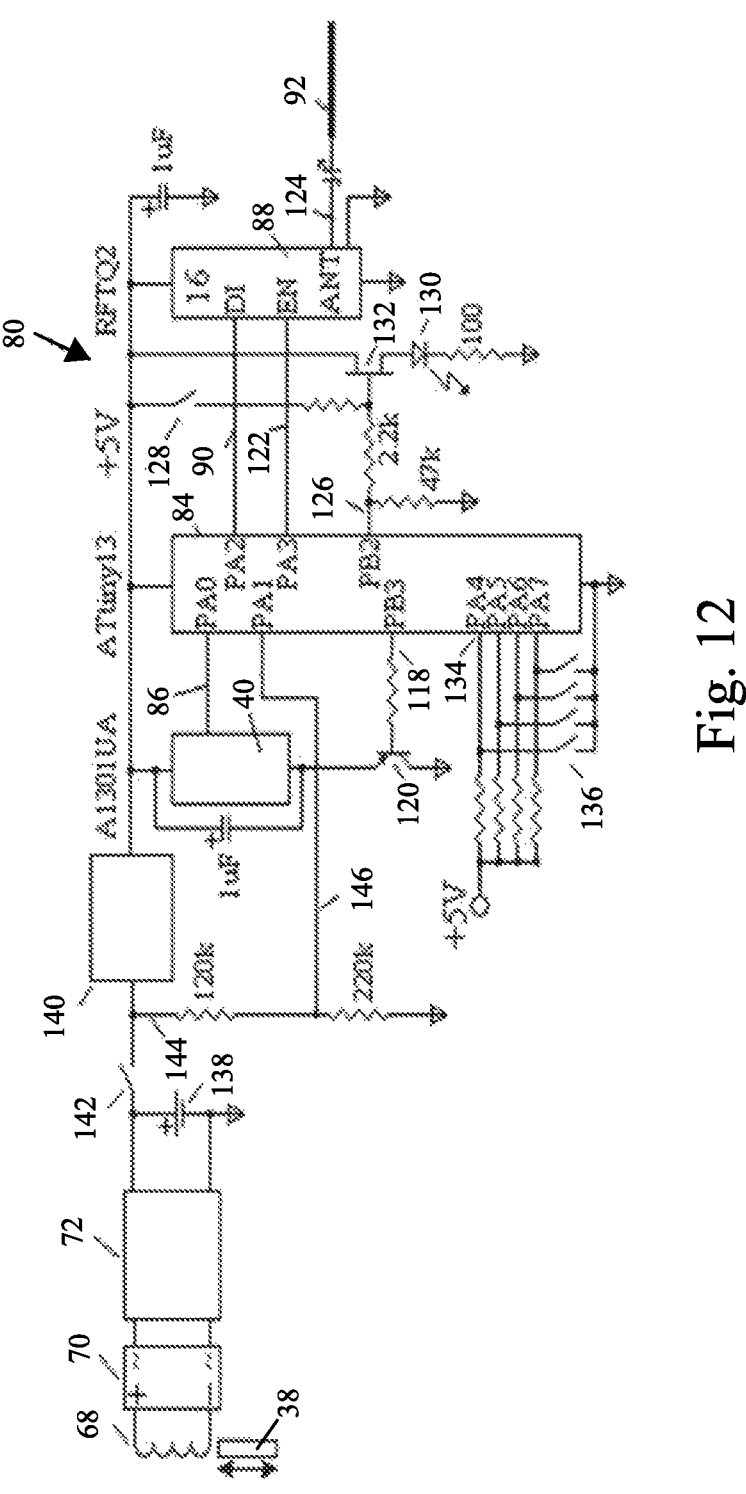
FIG. 12 is a diagram of the sender illustrated in FIG. 9, according to one embodiment.

Referring to FIGS. 7A, 7B, and 12, an embodiment of a schematic for the sender 80 is shown. The HED 40 can be configured such that it is responsive to the incident magnetic field with an output voltage approximating 2 mV per Gauss over a range of field strengths. The analog output voltage from HED 40 can be applied to the analog to digital converter input of the sender microprocessor 84 on line 86.

Figure 15:
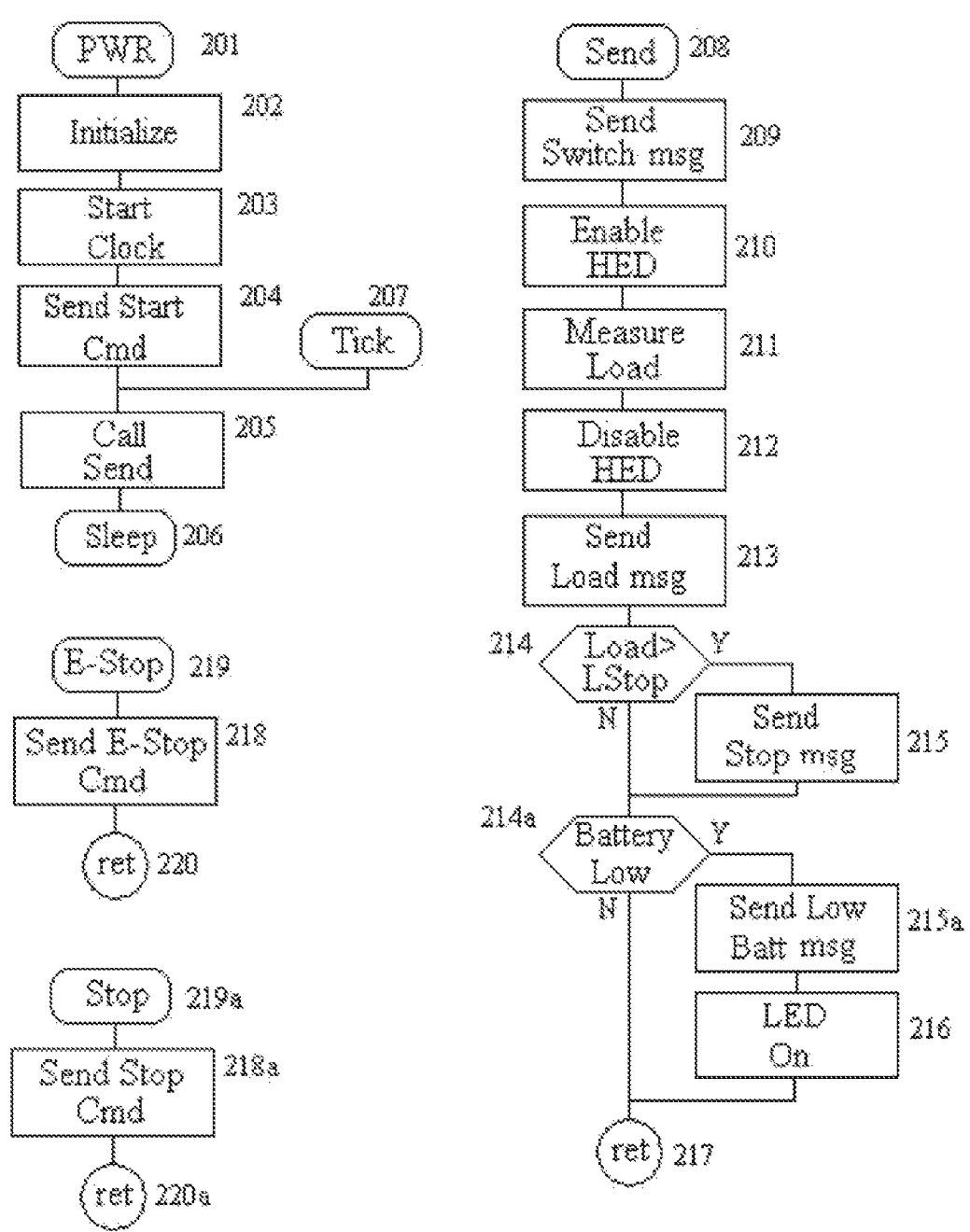
FIG. 15 a flowchart illustrating a sender algorithm according to one aspect of the disclosure.

A software algorithm, discussed in detail below in reference to FIG. 15, is configured to execute on the sender microprocessor 84 and transform the analog voltage on the line 86 to a digital pattern, which is transferred to the transmitter 88 on the line 90 for transmission to a remote supervisory system, for example the supervisory system 112, which controls the climb assist response to the applied load. Alternatively, the sender microprocessor 84 could be omitted and the signal on line 86 could be directly applied to a suitable transmitter, for transmission as an analog signal without digitization.

To extend the available duration of operational time for the sensor, it is desirable to minimize the power consumption of the climb assist system 10. Several mechanisms may be employed, for example in the load sensor system 30 to achieve acceptably low average power consumption. According to one embodiment, the HED 40 and the transmitter 88 can be configured to only be turned on when data is to be collected and transmitted, and to transmit data packets at a sufficiently high bit rate. As shown in the illustrated embodiment, when a line 118 is set low to turn on a PNP transistor 120, power is applied to HED 40. Also, microprocessor software may be configured to only turn on the transmitter 88 when a signal is required to be transmitted and then turn the transmitter 88 off upon completion of the transmission. To achieve this, the transmitter 88 can include an enable input which will turn it on to a higher power transmit state from a very low power consumption sleep state. As shown, the sender microprocessor 84 can be configured to set a line 122 to an enable state, which turns on the transmitter 88. The signal for transmission can then be applied on the line 90. Upon completion of the transmission radiated via a line 124 and the sender antenna 92, the line 122 may then be set to the not-enable state, then the transmitter 88 enters a low power state and power consumption is reduced.

To further reduce power when no information is to be measured or transferred, the sender microprocessor 84 may be set to various modes, one of which is where only an internal clock is operating. Consequently, the power consumption of the sender microprocessor 84 may be reduced to a minimum value until the internal clock times out whereupon the software algorithm may be configured to: power the HED 40 and the transmitter 88, transmit the measured data, then resume the low power state with the HED 40 and the transmitter 88 in the off state and the sender microprocessor 84 in the restricted clock state until the next clock timeout. The load sampling interval between measurement and transmission phases may be set from nominally zero, to any desired value. According to one embodiment, the load sampling interval can be between 0.1 and 10 seconds, for example 0.2 seconds. Note that the shorter the interval, the higher the average power consumption and the shorter the required time between energy storage device recharge cycles, or battery replacement. The load sampling interval may be varied dynamically throughout the period of climb to accommodate rapid setting of significant changes in the speed or torque required to provide effective climb assist, for example during initiation of climb assist.

Additional facilities may be provided in the sender 80 for information display and operator signaling. A line 126 from the sender microprocessor 84 may be set according the software algorithm to either input or output status. According to one aspect of the disclosure, the line 126 can normally be set as an input. If the operator closes a switch 128, the line 126 goes to a high signal level and the sender microprocessor 84 may be configured to respond to the change in signal level and wake up if in the restricted clock mode, otherwise it is awake. In an embodiment wherein the sender microprocessor 84 is configured to recognize transitions on the line 126 as an interrupt, the sender microprocessor 84 can be configured to immediately respond to the change and through the software algorithm cause a signal to be transmitted, for example to effect an immediate stop of the drive system 26, thus providing an emergency stop function. When the switch 128 is closed, an LED 130 can be illuminated via FET 132 to show the immediate stop state.

Also, if the line 126 from the sender microprocessor 84 is set high through the software algorithm, then the LED 130 can be configured to be set high via the FET 132. This may be used to signal whether the software algorithm is appropriately programmed to recognize specified conditions of interest to an operator, for example low battery or energy storage device voltage. Of course alternatives to, or in addition to, the LED 130 may be implemented, for example a sounder device configured to attract the operator's attention. Signaling via the LED 130 may be coded to represent different conditions, for example the LED 130 may be pulsed at a rate or on to off ratio to distinguish conditions such as low energy storage device voltage, failure of the HED 40, excess load, etc. According to one aspect of the disclosure, multiple indicators may be included.

Also shown are additional inputs 134 from switches 136. The switches 136 may be used to set various modes of operation, for example assist speed, load, or to set time delays of rates of change in application of assist. Alternative assignments of functions are possible with any suitable microprocessor.

The load sensor system 30 can be configured to implement unidirectional transmission or bi-directional communication, in which the sender 80 is capable of receiving signals as well as sending signals. Bi-directional systems can be used, for example, to quickly ensure integrity of communications or send alerts or information to the climber 12. The supervisory system 112 may turn off assist provided by the climb assist system 10 if signals are not received from the load sensor system 30 within a specified time, for example, within 3 seconds of the last transmission from the sender 80. For example, if the sender 80 is configured to transmit a signal 5 times per second, then a 3 second wait period would provide an indication that the communications path had failed and the drive system 26 could enter a safe state until communications resume.

In an embodiment, the climb assist system 10 can include a power supply having an energy storage device 138, for example a rechargeable battery and a voltage converting inverter 140 configured to provide the desired operating voltage for operation of the sender 80 from a range of voltages of said energy storage device 138.

According to one aspect of the disclosure, the sender 80 can be configured to be turned on when the load responsive magnet 38 moves into range of a switch 142. For example, a reed switch placed in proximity of the magnet 38 connects the energy storage device 138 to the inverter 140 to provide the required voltage, for example 5V, to the sender 80. Other components may be provided configured to power the transmitter 88, for example such that the power is applied only when the climb assist system 10 is required to operate. As another alternative, the switch 142 could be a mechanical switch manually operated, or mechanically coupled to respond to attachment and movement of the load sensor system 30 as previously disclosed.

According to one aspect of the disclosure, the sender 80 may include the charging system 72. The charging system 72 can include, but is not limited to, energy storage components such as: Alkaline & Zinc-Carbon with 1.52V per cell (not rechargeable); Mercury with 1.35V per cell (not rechargeable); Silver Zinc with 1.86V per cell (not rechargeable); Nickel Metal Hydride with 1.2V per cell (electrically rechargeable); Nickel Cadmium with 1.2V per cell (electrically rechargeable); Lithium Ion with 3.6V per cell (electrically rechargeable); Supercapacitor (electrically rechargeable); and Fuel cell (chemically rechargeable).

The above list includes examples and other types of energy storage components may be used. Each energy storage component can include a specified discharge characteristic where the decrease in voltage output over time has a particular characteristic. A single cell is depicted, however multiple cells may also be specified to bring the total voltage to the operating level required and thereby eliminate the need for the inverter 140.

Either a non-rechargeable energy storage device for example a zinc carbon cell may be used which may require periodic replacements, or where a rechargeable battery is used, the charging system 72 can be configured to recharge the battery to ensure adequate energy for operation whenever needed. The charging system 72 may include, but is not limited to: inductive energy transfer where the sensor is stored in proximity to a coil carrying alternating current to induce energy into a power receiver coil in the sensor when not in use; direct connection from an energy source to the energy storage device; ambient energy scavenging using piezo-electric generation from ambient vibration, thermoelectric effects, photoelectric generators, stray electric fields, etc. to provide the energy input; as depicted in FIG. 7A using the Faraday's Law of Electromagnetic Induction, and exampled in FIG. 12 with reference to the magnet 38, the coil 68, the rectifier 70 and the charging system 72 where movement of the magnet 38 relative to the coil 68 generates charge, rectified by the rectifier 70 and applied as a charging current to the energy storage device 138 via the charging system 72, as is obvious to those skilled in electronic systems.

The inverter 140 can be configured to transform the battery voltage, for example 1.2V to the required operating voltage for the load sensor components, for example 5V. According to one aspect of the disclosure, the voltage at a line 144 may be sampled and applied to the analog to digital converter input of the sender microprocessor 84 on a line 146, to provide information about the condition of the energy storage device 138. Thus according to one embodiment, the load sensor system 30 may be configured to transmit additional information about status of the energy storage device 138 to the supervisory system 112.

As a further alternative to the use of the energy storage device 138, energy harvesting devices may be employed. According to one embodiment, energy harvested from the environment can be from an electro-dynamic power generator resulting from movement, changed pressure or temperature, or other physical events. Additional components and values for those components are shown in the illustrated embodiment. These additional components and values are optional additions that can be included, excluded, or replaced (for example by a similar component with a different value, as will appreciated by one of skill in the art.

Figure 13:
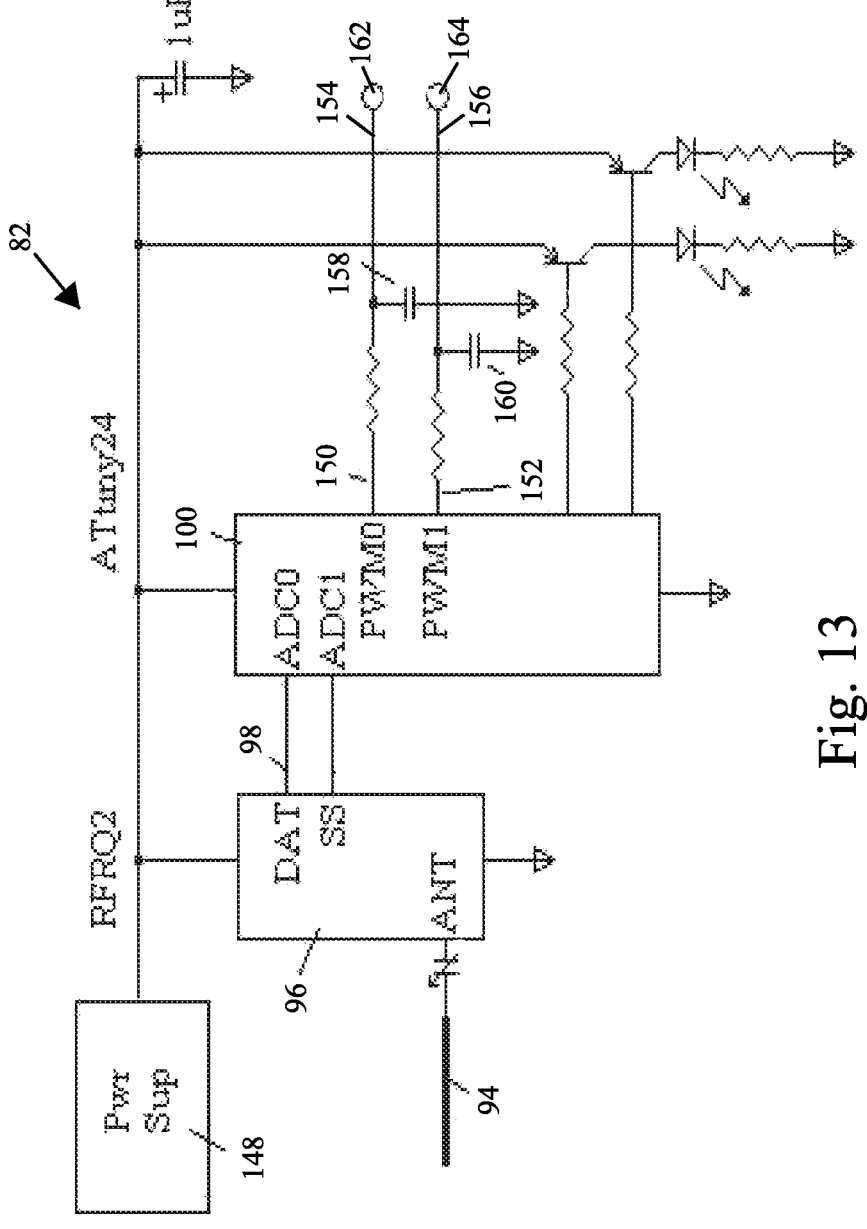
FIG. 13 is a diagram of the receiver illustrated in FIG. 10, according to one embodiment.

Referring to FIG. 13, according to one embodiment the receiver 82 can include a power supply 148 configured to supply power, for example 5V, to components of the receiver 82. The signal converter 96 is configured to receive signals from the sender 80 on the receiver antenna 94 and convert the received signal to demodulated data on the line 98, which enters the receiver microprocessor 100 for processing by software according to the preferred control algorithm. The received data can then be interpreted by the control algorithm which in turn generates signals representative of, for example, the preferred speed of the assist rope 20 and preferred torque delivered by the motor 110.

In one embodiment, a speed signal 162 and a torque signal 164 may be developed according to a PWM method that is executed on the receiver microprocessor 100. In that case, the PWM signals on a line 150 and a line 152 may be respectively converted to substantially steady signals on a line 154 and a line 156 by a low pass network 158 and a low pass network 160, respectively.

Other methods of generating the speed signal 162 and the torque signal 164 may also be employed, for example using a digital to analog converter to provide the speed signal 162 and the torque signal 164. If a received signal was already in analog form, an appropriate scaling algorithm may be employed to provide the speed signal 162 and the torque signal 164. Additional components and values for those components are shown in the illustrated embodiment. These additional components and values are optional additions that can be included, excluded, or replaced (for example by a similar component with a different value, as will appreciated by one of skill in the art.

Figure 14:
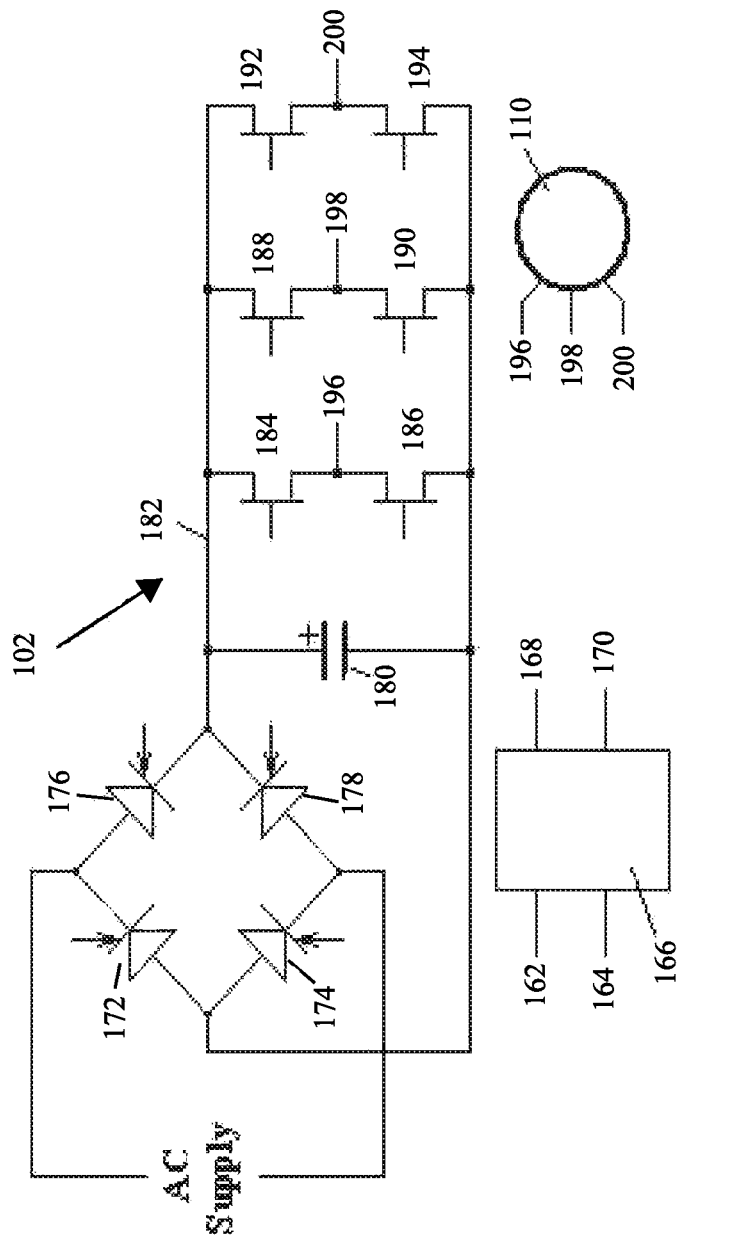
FIG. 14 is a diagram of a drive for a motor control according to one aspect of the disclosure.

Referring to FIG. 14, the drive control 102 can be configured to include a drive controller 166 configured to receive the speed signal 162 and the torque signal 164 and generate a voltage signal 168 and a frequency signal 170. According to one embodiment, timing of the voltage signal 168 can be configured to trigger a first silicon controlled rectifier (SCR) 172, a second SCR 174, a third SCR 176, and a fourth SCR 178 to develop the desired mean dc voltage at a capacitor 180 on a line 182. To operate the motor 110 the power switch devices 184, 186, 188, 190, 192, 194 would be switched by the frequency signal 170 in a sequence to provide the correctly phased supply to the motor 110 on lines 196, 198, 200. This schematic is diagrammatic only and other configurations are possible, for example, the voltage signal 168 and the frequency signal 170 may be multiphased.

If the motor 110 is of a different type such as a dc series motor, then the drive controller 166 can be selected to be appropriate to the motor 110 to provide the required speed and torque control. For example, as a considerable simplification, a single output may be applied to a commercially available SCR drive to provide voltage control to a DC type motor thereby providing speed and torque control according to the desired algorithm for climber support.

When an initiating transmission from the sender 80 is received, the motor 110 will ramp up over a period such as 1 second to provide an initial torque and speed to provide a limited assist for example of 50 lbs with a corresponding climb rate determined by the climber 12.

Referring to FIG. 3, according to one embodiment, level of assist and rate of assist may be limited in the control algorithm. According to one embodiment, the climb assist system 10 can include a slipping clutch, for example coupled to at least one of the first sheave 22 and the second sheave 24, such that excess assist, for example greater than 120 lb/sf, is prevented from being applied to the assist rope 20. In the event of the load being applied that exceeds the rated value for the slipping clutch, rotational speed of the respective sheave 22, 24 would differ from the input drive to the slipping clutch and thereby limit delivery of climb assist.

A maximum value of assist may also be set by selecting the motor 110 with a specified maximum deliverable torque. Alternatively current limiting in the drive system 26 may be employed to limit applied assist force.

As one feasible method to terminate assist to the assist rope 20, for example when the climber 12 wants to stop the system, the climber 12 can sag back against the assist direction for a specified minimum time, thereby exerting a load greater than a specified maximum load. When the control algorithm senses a load that exceeds the specified maximum load for a specified time, for example 3 seconds, then assist will be removed from the assist rope 20 and braking will be provided to limit further rotation of the second sheave 24. Optionally, the climb assist system 10 can include a control, for example a remote control, connected to the sender 80 which the climber 12 can operate to terminate assist.

Referring to FIG. 15, the sender 80 can be configured to transmit information to the receiver 82 according to an algorithm, an example of which is shown in the illustrated embodiment, the information being representative of activity of the climber 12 and status of the sender 80.

Referring to FIGS. 3, 12, and 15, when the sender 80 is activated by the climber 12, the sender 80 is powered on at 201 by, for example, the application of the switch 142 to close. The sender microprocessor 84 can then initialized at 202 and an internal clock is started at 203. The clock can be configured to generate a clock tick at a specified interval, preferably but not necessarily 5 per second. Of course other intervals may be selected. At 204, a Start command is sent to the receiver to initiate assist, then at 205 the subroutine Send 208 is called which provides data to the receiver 82 about the status of load and the sender 80 settings. Once the subroutine Send completes, the sender microprocessor 84 enters a low powered Sleep condition at 206 where power consumption is minimized until the next clock tick occurs at 207. At every instance of a tick, the subroutine Send is called, after which Sleep mode is re-entered at 206.

When the subroutine Send is called at 208, the status of any operator controls, for example but not limited to the switch 128 and the switch 136, can indicate, for example a direction the climber 12 desires to move (such as up or down). Alternative means of commanding desired direction may be employed such as a multiple tug on the lanyard 28 to cause the load sensor system 30 to interpret this as a down direction command, whereas a single tug could be interpreted as an up direction command.

The HED 40 is enabled at 210, for example via the PNP transistor 120, the signal representative of load exerted by the climber 12 from the HED 40 is read at 211 by the sender microprocessor 84 and the HED 40 can then be disabled at 212 to conserve power. A message representing measured load is sent at 213.

At 214 the value of the measured load is assessed, and if the value of the measured load exceeds a specified value LStop, then a stop message is sent at 215 to the receiver 82 to terminate load assist. Such an event may be caused by the climber 12 deliberately sagging back against the assist rope 20 to stop load assist.

If battery condition is measured as low at 214a, a low battery warning message is sent at 215 and the LED 130 can be turned on at 216 to warn the climber 12 of low battery status. Of course the LED 130 draws extra power, so it may be operated in a pulsed manner to minimize extra power consumption.

The described cycle repeats at every tick. At each cycle, additional power is drained from the energy storage device 138, and particularly as current consumption during each transmission is relatively high. While the foregoing description included multiple instances of transmission at 204, 209, 213 and 215, a compilation of each category of message into a single transmitted packet may provide a significant reduction in power requirement.

If an immediate stop is required and further operation of the assist system is to be prevented, a switch correspondingly given the function Stop may be configured to cause an interrupt at 219a and immediate transmission of the Stop command 218a is made. To improve assurance of the Stop command being enacted, the sender 80 may optionally transmit the Stop command multiple times.

To extend availability of power it is advantageous to provide a means of augmenting available energy such as previously described.

Figure 16:
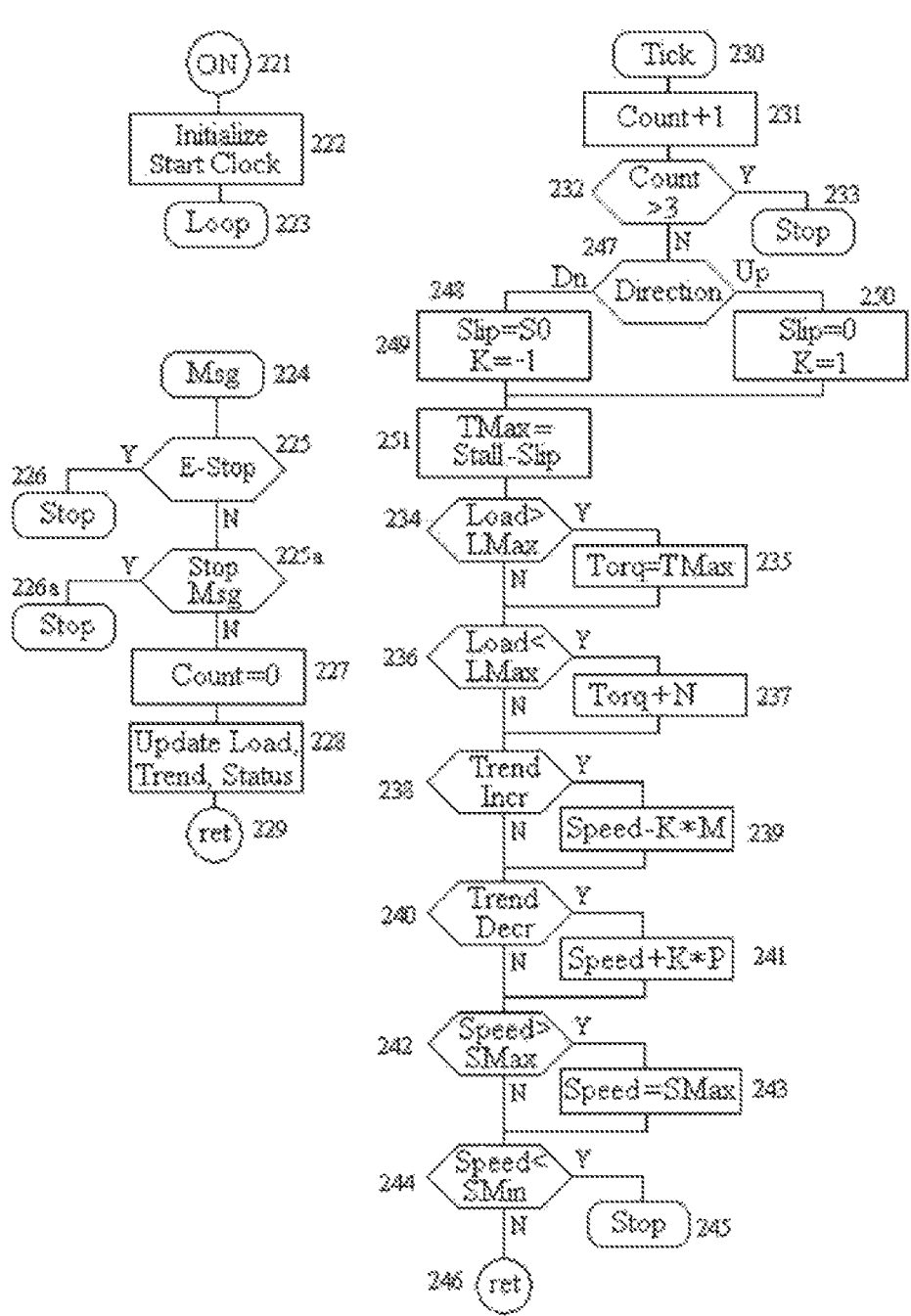
FIG. 16 a flowchart illustrating a receiver algorithm according to one aspect of the disclosure.

Referring to FIG. 16, the receiver 82 can be configured to receive information from the sender 80 and send commands to drive control 102 according to an algorithm, an example of which is shown in the illustrated embodiment, to provide the desired level of assist to the climber 12.

Referring to FIGS. 3, 13, and 16, when power is applied to the receiver 82 at 221, the receiver microprocessor 100 is initialized at 222 and a clock is started. The clock is configured to generate a clock tick at a specified interval, preferably but not necessarily every one second. Other intervals may be selected. The program then waits for an event to occur in a loop at 223.

During initialization, key parameters may be set, such as the starting speed and/or torque for assist. Such minimum values are set such that the climber 12 is not subject to sudden jerks or excessive force or an assist speed which could cause distress and risk of injury to the climber 12.

Interrupts may be used to initiate responses to tick events, and to receive a message from the sender 80. Other events such as operator control actions at the drive system 26 or from controls where provided may also cause actions. In an interrupt driven system and as described herein, an interrupt will act to cause a specified service routine to enact and complete. Thereafter, operation returns to the function operating at the moment of the interrupt. In one embodiment, interrupts may occur while the receiver 82 is executing the wait loop 223.

In response to receipt of a message, the segment at 224 is entered from the loop. If the message contains a stop command, the drive system 26 is stopped and assist is removed.

According to one embodiment, the climb assist system 10 can be configured such that an immediate stop will disable all further operation until power to the receiver 82 is recycled off-on, or some other intervention action is made, whereas a stop command will stop the drive system 26 with further enablement being possible by normal command from the sender 80.

Once a message is received at 224 that is not of the stop class, the value Count is reset to zero to prevent premature cessation of load assist, and the records of data contained in the message such as load, load trend computed from a history of load samples and switch settings is updated at 228, and the routine is exited.

On generation of tick, the routine at 230 is initiated and a counter is incremented at 231. The purpose of the counter is to provide a timer to time out and terminate assist if no further messages are received from the sender 80. At 232 the count is checked and if the count exceeds a limit value for example but not necessarily 3, then the drive system 26 is stopped and load assist is removed. A variety of subsequent control actions may be defined, including re-enabling assist by re-starting the drive system 26 based on commands from the climber 12. Alternatively, power to the drive system 26 may be recycled to re-initialize the climb assist system 10 for normal resumption of operation.

If the count has not reached the limit value then parameters K and Slip are set at 248 and 250 based on the sensed direction of assist at 247 required by the climber 12, and the value TMax is set at 249. Specifically, K determines the direction of modification of torque and speed for assist and Slip sets the degree to which the drive system 26 may be allowed to run forwards or backwards according to the climber 12 direction being up or down. When loaded to a specified amount, the torque limit of the motor 110, TMax, will determine motor slip which is defined as the deviation between the no-load and loaded speed. Consequently TMax is set at 251 or another value in the range such as 0 to 255.

At 234 the value of the measured load is compared with a specified value stated as LMax, for example but not necessarily 120 lbs, and if greater than LMax then the drive system torque is set to the maximum value at 235.

At 236 the value of the measured load is again compared with the specified value stated as LMax, and if less than LMax then the drive system torque is changed by a factor K*N at 237. Factor N may be chosen as for example but not necessarily 10% of the maximum specified value of LMax. Consequently said assist torque may be progressively changed in steps towards the desired maximum value LMax without feeling jerky to the climber 12. K is +1 or −1 accordingly as the direction is up or down.

If the climber 12 sags back against the assist in the up direction and load exceeds said value LStop then assist will be terminated as previously described. In the down direction assist will stop after a delay once load on the load sensor system 30 is removed or communications ceases, and additionally once said rope grab 18 is unloaded it may be designed to no longer have frictional attachment to said assist rope 20 as is a characteristic of commercially available rope grabs, so will cease support to the climber 12.

At 238 the value of the trend of the load is assessed, and if the trend of the load is increasing for the up direction, it implies that the climber 12 may be tired and unable to keep up with the level of assist being provided, consequently the speed of assist may be decreased by a factor M (K=1) at 239. In the down direction an increase in load trend implies that the climber 12 may want to descend faster, so speed is increased by the factor M (I(=−1).

Factor M may be chosen as, for example but not limited to, 10% of the maximum specified value of speed. Consequently said assist speed may be progressively decremented towards a desired minimum value without feeling jerky to the climber 12. Note that the minimum value may also include zero speed and that K is +1 or −1, accordingly, as the direction is up or down.

At 240 the value of the trend of the load is assessed, and if the trend of the load is decreasing for the up direction, it implies that the climber 12 may be moving faster than assist is providing support. Consequently the speed of assist may be increased by a factor P at 241. In the down direction an increase in load implies that the climber 12 wants to descend faster, so speed is decreased by the factor M (K=−1) to allow higher slip.

Factor P may be chosen as, for example but not limited to, 10% of the maximum specified value of speed. Consequently the assist speed may be progressively incremented towards a desired maximum value SMax without feeling "jerky" to the climber 12.

At 242 the value of assist speed is assessed and if it exceeds a specified maximum value SMax then speed is set to SMax at 243. At 244 the value of the speed is assessed and if less than a specified minimum value SMin, for example but not necessarily 5 ft/min, then assist will be terminated as previously described. Following completion of Tick processing the receiver 82 returns at 246 to continue the wait loop at 223 until a next event occurs.

In the above, the maximum value of torque TMax can be, for example but not limited to, configured to deliver 120 lb/sf to the climber 12. Additionally, the maximum speed SMax is such that the speed of the assist rope 20 is, for example but not limited to, 100 ft/min.

Several classes of stop conditions may be defined where differing actions result such as: an immediate condition where the drive system 26 is completely disabled from further assist, for example at 219a; a normal stop condition, for example where the climber 12 sags back against the assist rope 20 (in this condition the drive system 26 may be restarted upon the climber 12 command, for example at 214); where the assist speed is less than a specified minimum value, for example at 244, (in this condition the drive system 26 may be restarted upon the climber 12 command).

In one embodiment, the algorithm in receiver microprocessor 100 for control of assist delivered to the climber 12 may be modified based on the relationship between power (P), torque (T) and rotational speed (R) for the motor 110: P=kTR where k is a constant. In the above description of control using torque and speed where speed of the motor 110 has a direct relationship to assist rope speed, then where one parameter is adjusted to suit the climber's 12 need, then the other parameter would also be set to keep the equation P=kTR balanced. Other relationships between load and delivered power may be specified, for example to maximize the climber's 12 perception of value of delivered assist.

For example if Power P was a parameter selectable by the climber 12 (possibly as a function of climber weight) as speed (R) was varied, then torque T would be adjusted using T=P/(kR). Similarly as torque varies, then speed R is adjusted using R=P/(kT).

In some embodiments, only one parameter may be varied such as speed or torque, keeping the other parameter constant. In one embodiment, the selected power level may be kept constant. Such control may be exemplified where a DC motor is used, control being applied from applied voltage.

As the climber's 12 load, as sensed by the load sensor system 30, may not be constant as the climber 12 moves from ladder rung to rung, additional signal processing may be performed to compensate for these climber 12 induced cyclic variations in load. Filtered values of the measured signal representing the load may be used. The sampling rate may be set to a different sampling rates, and may be dynamically selected based in part on signal processing to provide an optimal representation of the climber's 12 load.

In some embodiments, time delays may be included to prevent undesirable changes in assist, for example when a small change is sensed in load or load rate, then a longer time delay, for example 3 seconds, may be imposed before changing assist. If a large change occurs, then a shorter delay, for example 1 second, in changing assist may be utilized. Other time delays may be applied to starting and stopping the assist according to the status of the climb assist system 10. For example, an immediate stop should be immediate, whereas a normal stop may take longer, for example by ramping down the speed to zero, for example in 1 second. Similarly when assist is started, it may be desirable to ramp to the desired speed to prevent a jerk start, similarly for stop conditions.

In some embodiments, the desired level of processing may be included as an algorithm operating in the sender microprocessor 84, including managing the relationship between power, torque and speed for transmission to the receiver 82 for motor control. To minimize power consumed by the sender 80, sender processing requirements may be reduced.

Figure 17:
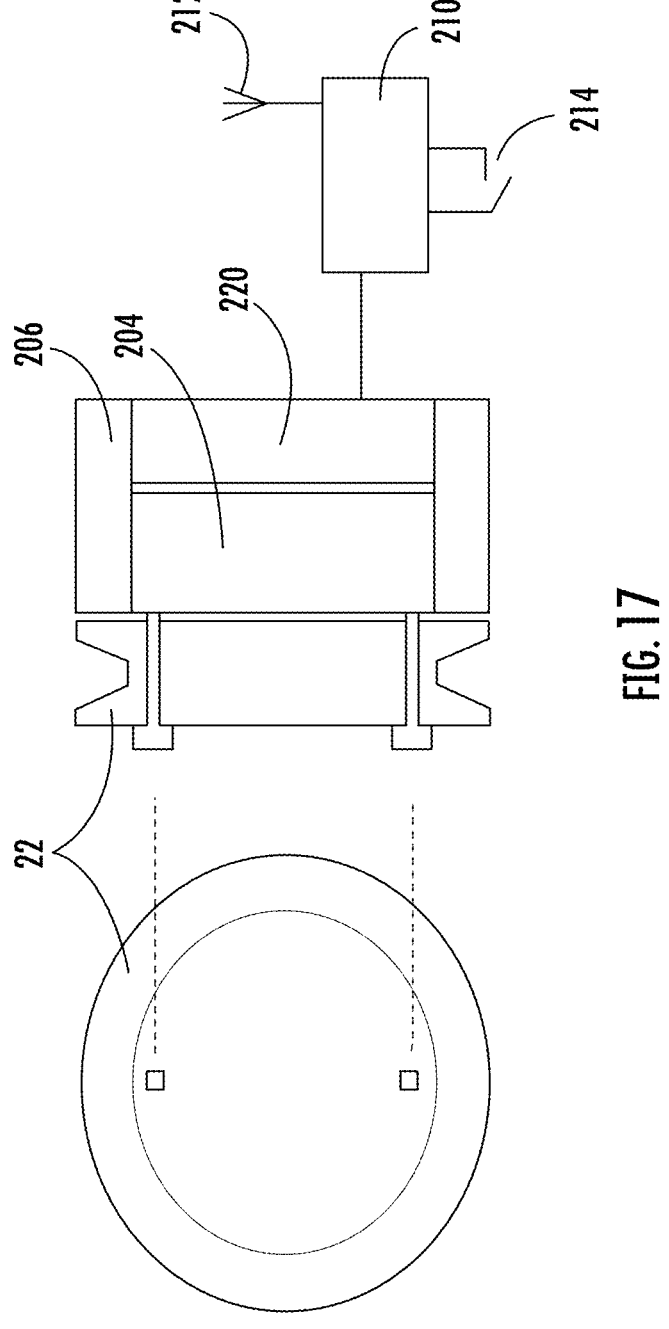
FIG. 17 is a diagram of an overspeed governor according to one aspect of the disclosure.

Referring to FIGS. 3 and 17, the climb assist system 10 can include an overspeed governor 202. To prevent an overspeed condition causing a hazard to the climber 12 in the event of a fault causing assist speed to increase beyond a safe value, the overspeed governor 202 can be positioned, for example, in close proximity to either of the first sheave 22 and the second sheave 24 and configured to terminate or limit assist.

According to one embodiment, the first sheave 22 is associated with an overspeed governor 202 such that above a threshold speed of rotation of the first sheave 22, for example a climb speed of 100 ft/min, a clutch 204 engages a brake 206 to progressively load or stall the drive system 26 and limit the available drive from the motor 110. Where the brake 206 acts to progressively load the drive system 26, an ultimate maximum speed may be set, for example 120 ft/min. The drive from the motor 110 may be inhibited until the climb assist system 10 is reset, for example, by running the first sheave 22 in the opposite direction momentarily.

The overspeed governor 202 may include a power generator 220 to power communication from an associated sender 210 via antenna 212 to the receiver elsewhere in the event that an overspeed or any other fault condition is detected. The associated sender 210 may also include a switch 214 such that a rescue mode can be initiated anywhere on the structure 16 to avoid the need to descend the ladder 14 first to set the desired mode. In a rescue mode, unpowered descent at a controlled speed relatively independent of load may be provided. According to one aspect of the disclosure, the motor 110 may be used in regenerative mode during rescue mode.

As described above, the functionality of the overspeed governor 202 may be implemented using firmware and may be integrated with the functionality of one or more of the other aspects of the climb assist system 10 as disclosed herein. In one embodiment, the applied load may be sensed at either the first sheave 22 or the second sheave 24 with an appropriate load measuring apparatus.

Figure 18:
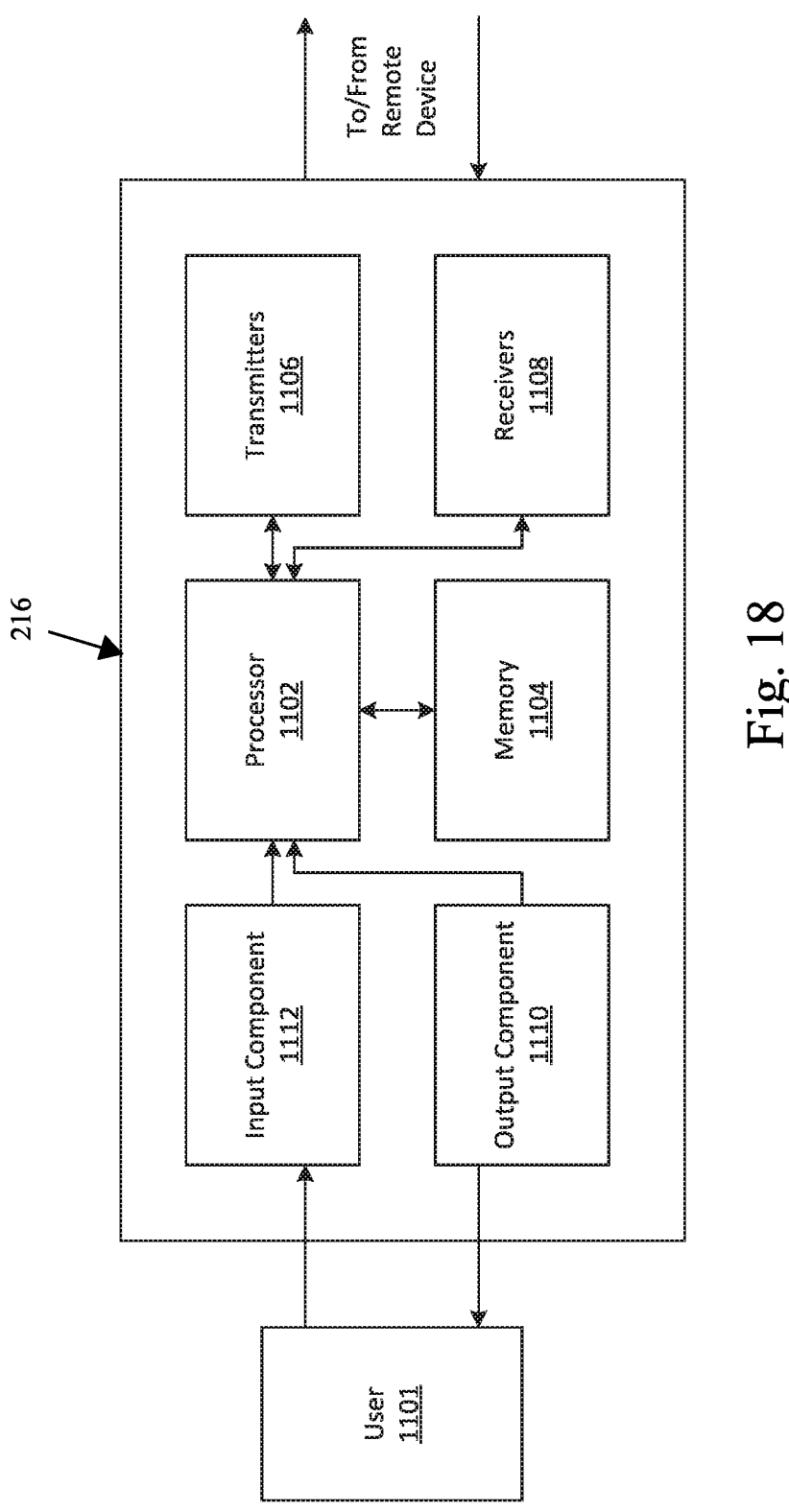
FIG. 18 is diagram of a computing device configured to implement aspects of the disclosure.

Referring to FIG. 18, the climb assist system 10 can include a node 216 of a wireless mesh network. Targets and sources may include aspects of the example diagram shown in the illustrated embodiment. In one example, the node 216 may include a processor 1102, a memory device 1104 coupled to processor 1102, one or more wireless transmitters 1106, one or more wireless receivers 1108, an output component 1110, and an input component 1112.

Processor 1102 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are not intended to limit in any way the definition and/or meaning of the term "processor."

The memory device 1104 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the exemplary implementation, the memory device 1104 includes data and/or instructions embodying aspects of the disclosure that are executable by the processor 1102 (e.g., the processor 1102 may be programmed by the instructions) to enable the processor 1102 to perform the functions described herein. Additionally, the memory device 1104 may comprise an operation system and applications.

The wireless transmitters 1106 can be configured to transmit control signals and data signals over a wireless mesh network. In one example, the wireless transmitters 1106 may transmit in a radio frequency spectrum and operate using an appropriate communication protocol. Each of the wireless transmitter 1106 may on a particular radio frequency channel or a plurality of channels.

The wireless receivers 1108 can be configured to receive control signals and data signals over a wireless mesh network. In one example, wireless receivers 1108 may receive signals on a radio frequency spectrum. Each of the wireless receivers 1108 may receive signals on a particular radio frequency channel or a plurality of channels.

The node may also include at least one output component 1110 configured to present information to a user 1101. The output component 1110 may be any component capable of conveying information to the user 1101. In some implementations, the output component 1110 includes an output adapter, such as a video adapter and/or an audio adapter or the like. An output adapter can be operatively coupled to the processor 1102 and can be configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with the output component 1110.

The node 216 may also include at least one input component 1112 configured to receive input from the user 1101. The input component 1112 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of the output component 1110 and the input component 1112. In some implementations, the output component 1110 and/or the input component 1112 include an adapter configured to communicate data and/or instructions between the node 216 and a computer connected thereto.

It is understood that the term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s). Additionally, computer executable instructions embodying aspects of the invention may be stored in ROM EEPROM, hard disk (not shown), RAM, removable magnetic disk, optical disk, and/or a cache of processing unit. A number of program modules may be stored on the hard disk, magnetic disk, optical disk, ROM, EEPROM or RAM, including an operating system, one or more application programs, other program modules and program data.

The foregoing description has set forth various embodiments of the apparatus and methods via the use of diagrams and examples. While the present disclosure has been described in connection with the preferred embodiments of the various figures, it is to be understood that other similar embodiments may be used or modifications and additions may be made to the described embodiment for performing the same function of the present disclosure without deviating there from. Furthermore, it should be emphasized that a variety of applications, including rock climbing, building escape or rescue methods, or any other application requiring vertical or near vertical transport of a person are herein contemplated. Therefore, the present disclosure should not be limited to any single embodiment, but rather construed in breadth and scope in accordance with the appended claims. Additional features of this disclosure are set forth in the following claims.

What is claimed:

1. A climb assist system configured to provide load assist to a climber during movement along a vertical direction on a structure, the climb assist system comprising:
   an assist rope that extends along at least a portion of the structure in the vertical direction;
   a rope grab configured to couple the climber to the assist rope such that movement of the climber relative to the assist rope is restricted;
   a drive system coupled to the assist rope such that the drive system is configured to provide the load assist to the assist rope;
   a brake configured to apply a braking force to slow downward movement of the climber;
   a load sensor system configured to: 1) detect a load applied to the rope grab; 2) generate a detected rope grab signal in response to the detected load and 3) transmit the detected rope grab signal over a first channel; and
   a remote control system configured to:
      receive the detected rope grab signal over the first channel from the load sensor system;
      receive a detected drive system signal over a second channel from the drive system;
      interpret the detected rope grab signal, and the detected drive system signal to determine a load assist value;
      generate a voltage signal corresponding to the load assist value;
      transmit the voltage signal over a third channel to the drive system to cause the drive system to dynamically adjust the load assist provided to the assist rope based on the voltage signal; and
      transmit a braking signal over the second channel to the brake to cause the drive system to apply the braking force when analyzing the detected load indicates an excess speed.

2. The climb assist system of claim 1, wherein the load assist includes a level of assist and a rate of assist.

3. The climb assist system of claim 2, wherein the level of assist includes a force applied to the assist rope, and the rate of assist includes a speed in the vertical direction applied to the assist rope.

4. The climb assist system of claim 1, wherein the load sensor system includes a magnet and a Hall Effect device, at least one of the magnet and the Hall Effect device being movable relative to the other of the magnet and the Hall Effect device in response to a change in the load applied to the rope grab.

5. The climb assist system of claim 4, further comprising a lanyard configured to couple the climber to the rope grab.

6. The climb assist system of claim 5, wherein the load sensor system includes a movable member that supports one of the magnet and the Hall Effect device, the lanyard is coupled to the movable member such that as the load applied to the rope grab changes the movable member moves thus changing a distance measured from the magnet to the Hall Effect device, and the changing distance generates the detected rope grab signal.

7. The climb assist system of claim 6, wherein the load sensor system includes a biasing member configured to exert a biasing force on the movable member to maintain the distance in the absence of a change in the load applied to the assist rope.

8. The climb assist system of claim 4, wherein the load sensor system includes a flexible material, at least one of the magnet and the Hall Effect device are coupled to the flexible material, and the flexible material is configured to stretch and compress in response to a change in the load applied to the assist rope.

9. The climb assist system of claim 8, further comprising a lanyard configured to couple the climber to the rope grab, wherein the flexible material is positioned between a first portion of the lanyard that extends from the flexible material toward the climber and a second portion of the lanyard that extends from the flexible material toward the rope grab.

10. The climb assist system of claim 4, wherein the load sensor system includes an inner shell and an outer shell, the inner shell carrying one of the magnet and the Hall Effect device, and the outer shell carrying the other of the magnet and the Hall Effect device, the inner shell and the outer shell movable with respect to one another in response to a change in the load applied to the rope grab.

11. The climb assist system of claim 10, wherein one of the inner shell and the outer shell includes a pin, the other of the inner shell and the outer shell defines a slot configured to receive the pin, and the pin is moveable in the slot so as to define a maximum amount of displacement of the inner shell relative to the outer shell.

12. The climb assist system of claim 1, wherein the drive system includes a motor and a motor control device configured to adjust at least one characteristic of the motor in response to the voltage signal sent to the drive system.

13. The climb assist system of claim 12, wherein the at least one characteristic includes output speed, output torque, or both.

14. The climb assist system of claim 12, further comprising a sheave configured to receive the assist rope such that the sheave is configured to apply a force to the assist rope to move the assist rope along the vertical direction.

15. The climb assist system of claim 14, wherein the motor is coupled to the sheave such that the motor applies a torque to the sheave thereby causing the sheave to apply the force to the assist rope.

16. The climb assist system of claim 4, wherein the load sensor system includes a coil of wire, the load sensor system is configured such that the magnet is movable relative to the coil of wire in response to a change in the load applied to the rope grab, and movement of the magnet relative to the coil of wire generates an electrical current in the coil of wire.

17. The climb assist system of claim 1, wherein the load sensor system is configured to monitor an acceleration along the vertical direction, and the remote control system is further configured to send a signal to the brake to apply the braking force when the acceleration remains at or above a predetermined acceleration limit for a second specified period of time.

18. The climb assist system of claim 1, wherein the remote control system is configured to detect a change in the load applied to the rope grab, and the remote control system is further configured to send a signal to the brake to apply the braking force upon the detected load applied to the rope grab surpassing a preset load value.

19. A climb assist system configured to provide load assist to a climber during movement along a vertical direction on a structure, the climb assist system comprising:
a first sheave coupled to an upper area of the structure;
a second sheave coupled to a lower area of the structure;
an assist rope that extends along at least a portion of the structure in the vertical direction, the assist rope extending between the first sheave and the second sheave;

a rope grab configured to couple the climber to the assist rope such that movement of the climber relative to the assist rope is restricted;
a drive system coupled to the assist rope such that the drive system is configured to provide the load assist to the assist rope;
a brake configured to apply a braking force to slow downward movement of the climber;
an input device configured to receive user input from a climber;
a load sensor system configured to:
detect a load applied to the rope grab;
generate a detected rope grab signal in response to the detected load; and
transmit the detected rope grab signal; and
a control system configured to:
receive the detected rope grab signal over a first channel from the load sensor system, the detected rope grab signal indicating a jerk of the climber during a descent along the vertical direction;
receive a detected drive system signal over a second channel from the drive system;
receive the user input over a third channel from the input device;
interpret the detected rope grab signal, the detected drive system signal, and the user input to determine a load assist value, including comparing the monitored jerk of the climber with a predetermined jerk limit;
generate a voltage signal corresponding to the load assist value;
transmit a control system signal to the input device over a fourth channel;
transmit the voltage signal to the drive system over a fifth channel to cause the drive system to dynamically adjust the load assist provided to the assist rope based on the voltage signal; and
transmit a braking signal to the brake over a sixth channel to cause the drive system to apply the braking force when analyzing the detected load indicates an excess speed, wherein:
responsive to determining the monitored jerk meets or exceeds the predetermined jerk limit for any detectable time during a specified period of time, the braking signal is transmitted to the brake to apply the braking force.

20. A climb assist system configured to provide load assist to a climber during movement along a vertical direction on a structure, the climb assist system comprising:
an assist rope that extends along at least a portion of the structure in the vertical direction;
a rope grab configured to couple the climber to the assist rope such that movement of the climber relative to the assist rope is restricted;
a drive system coupled to the assist rope such that the drive system is configured to provide the load assist to the assist rope, the drive system defining a first node;
a brake configured to apply a braking force to slow downward movement of the climber, the brake defining a second node;
an input device configured to receive user input from a climber, the input device defining a third node, the third node comprising:
an input component configured to receive the user input from the climber;
an output component configured to present information to the climber;

a wireless transmitter configured to transmit the user input over a wireless mesh network; and a wireless receiver configured to receive a control system signal over the wireless mesh network;

a load sensor system defining a fourth node, the load sensor system configured to:

detect a load applied to the rope grab;

generate a detected rope grab signal in response to the detected load; and transmit the detected rope grab signal; and a remote control system defining a fifth node, the remote control system configured to:

receive the detected rope grab signal from the load sensor system;

receive a detected drive system signal from the drive system;

receive the user input from the input device;

interpret the detected rope grab signal, the detected drive system signal, and the user input to determine a load assist value;

generate a voltage signal corresponding to the load assist value;

transmit the voltage signal to the drive system to cause the drive system to dynamically adjust the load assist provided to the assist rope based on the voltage signal;

transmit the control system signal to the input device; and transmit a braking signal to the brake to cause the drive system to apply the braking force when analyzing the detected load indicates an excess speed.

* * * * *